(12) United States Patent
Ishibashi et al.

(10) Patent No.: US 9,969,557 B2
(45) Date of Patent: May 15, 2018

(54) CART-TYPE TRANSPORTING DEVICE

(71) Applicant: Daifuku Co., Ltd., Osaka (JP)

(72) Inventors: Masahiro Ishibashi, Osaka (JP); Junichi Muranaga, Osaka (JP); Shigeru Baba, Osaka (JP); Yukichi Tamura, Osaka (JP); Shigeyuki Kusuhara, Osaka (JP)

(73) Assignee: Daifuku Co., Ltd. (JP)

( * ) Notice: Subject to any disclaimer, the term of this patent is extended or adjusted under 35 U.S.C. 154(b) by 0 days. days.

(21) Appl. No.: 15/590,650

(22) Filed: May 9, 2017

(65) Prior Publication Data

US 2017/0240359 A1  Aug. 24, 2017

Related U.S. Application Data

(63) Continuation of application No. PCT/JP2015/079133, filed on Oct. 15, 2015.

(30) Foreign Application Priority Data

Nov. 11, 2014  (JP) .................................. 2014-228731

(51) Int. Cl.
| | | |
|---|---|---|
| B65G 17/16 | (2006.01) | |
| B65G 17/12 | (2006.01) | |
| B65G 17/06 | (2006.01) | |
| B60P 1/36 | (2006.01) | |
| B65G 17/14 | (2006.01) | |

(52) U.S. Cl.
CPC ........... *B65G 17/123* (2013.01); *B65G 17/06* (2013.01); *B60P 1/36* (2013.01); *B65G 17/12* (2013.01); *B65G 17/126* (2013.01); *B65G 17/14* (2013.01); *B65G 2201/02* (2013.01)

(58) Field of Classification Search
CPC ...... B65G 17/38; B65G 17/12; B65G 17/123; B65G 17/42
USPC .................................................. 198/797, 799
See application file for complete search history.

(56) References Cited

U.S. PATENT DOCUMENTS

| | | | | |
|---|---|---|---|---|
| 2,082,206 A | * | 6/1937 | Jennings ............... | B65G 17/123 12/1 A |
| 3,850,106 A | * | 11/1974 | Krivec ...................... | B61B 9/00 104/127 |
| 4,627,530 A | * | 12/1986 | Franke ................. | B65G 17/123 198/799 |

(Continued)

FOREIGN PATENT DOCUMENTS

JP  2011079624 A  4/2011

*Primary Examiner* — James R Bidwell
(74) *Attorney, Agent, or Firm* — St. Onge Steward Johnston & Reens LLC

(57) ABSTRACT

A cart-type transporting device has a first endless chain and a second endless chain that move in conjunction with and parallel to one another in a lifting/lowering pathway section, and the first and second endless chains have engaging parts. A transporting cart has engaged parts that engage with the engaging parts of the first endless chain in a horizontal pathway section In the first endless chain, the engaging parts are provided at regular intervals, and the engaging parts of the first endless chain and the engaged parts of the transporting cart are detachably fitted together such that the transporting cart can be attached/detached in the vertical direction in the horizontal pathway section.

2 Claims, 24 Drawing Sheets

(56) References Cited

U.S. PATENT DOCUMENTS

| | | | | |
|---|---|---|---|---|
| 4,883,167 A | * | 11/1989 | Shibata | B65G 17/126 |
| | | | | 198/712 |
| 5,263,574 A | * | 11/1993 | Hix | B65G 17/123 |
| | | | | 198/799 |
| 5,922,230 A | * | 7/1999 | Yokota | B23K 1/008 |
| | | | | 198/465.3 |

* cited by examiner

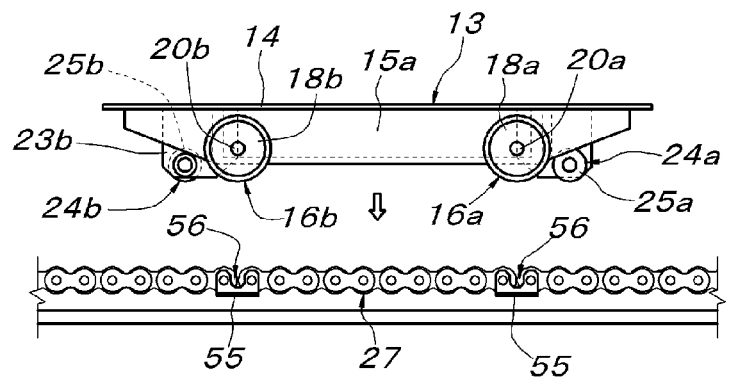
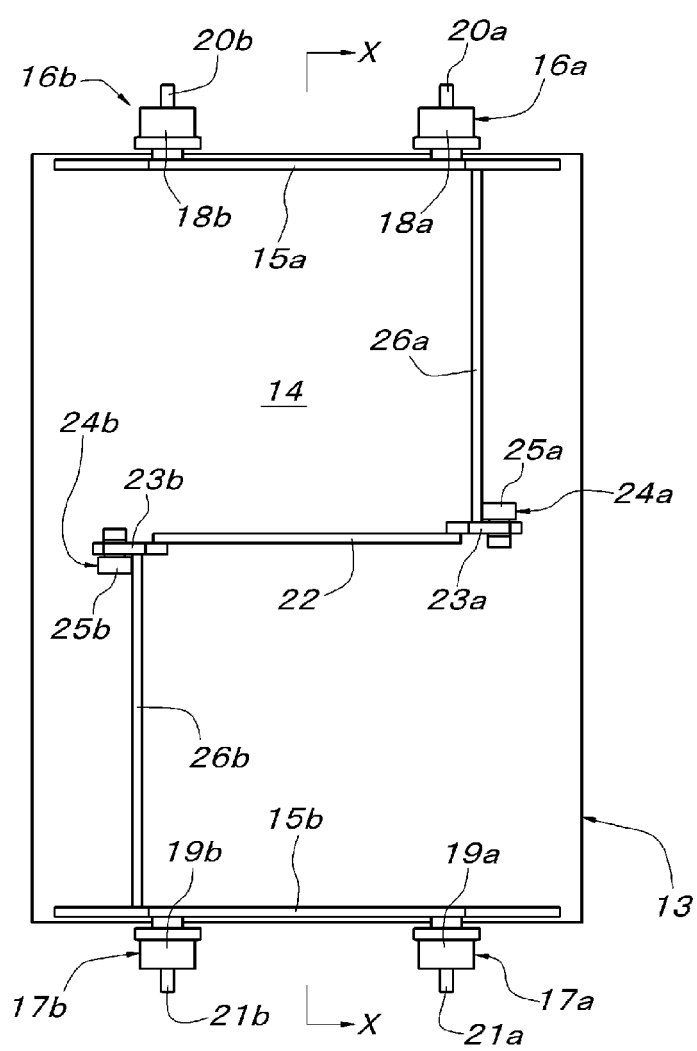
FIG. 2(A)
FIG. 2(B)
FIG. 2(C)

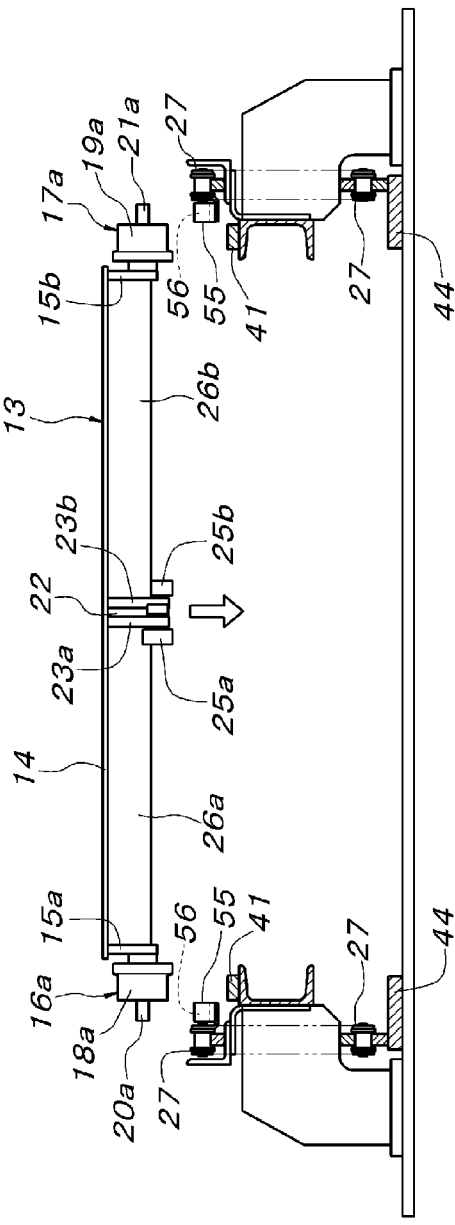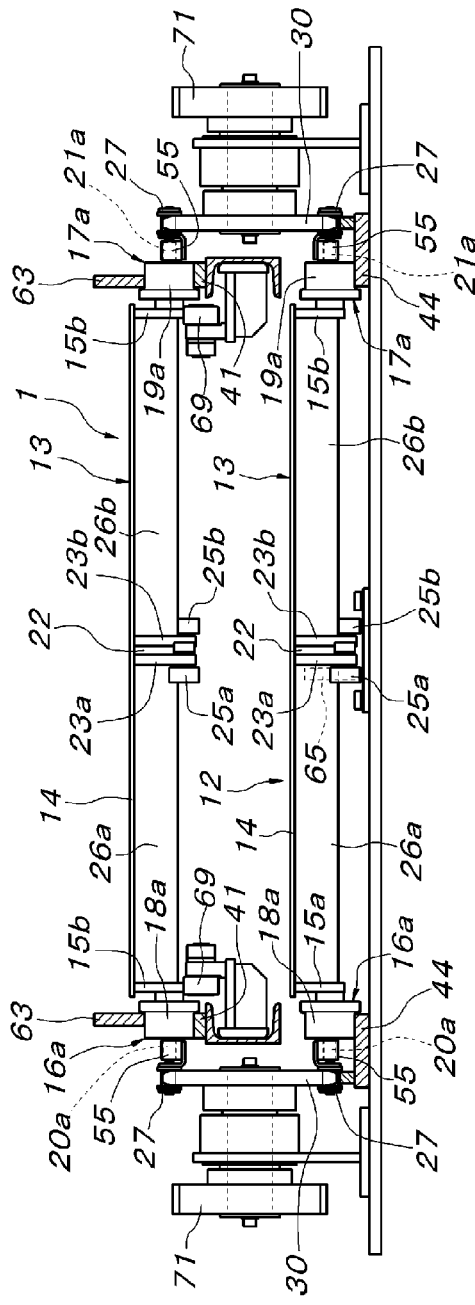

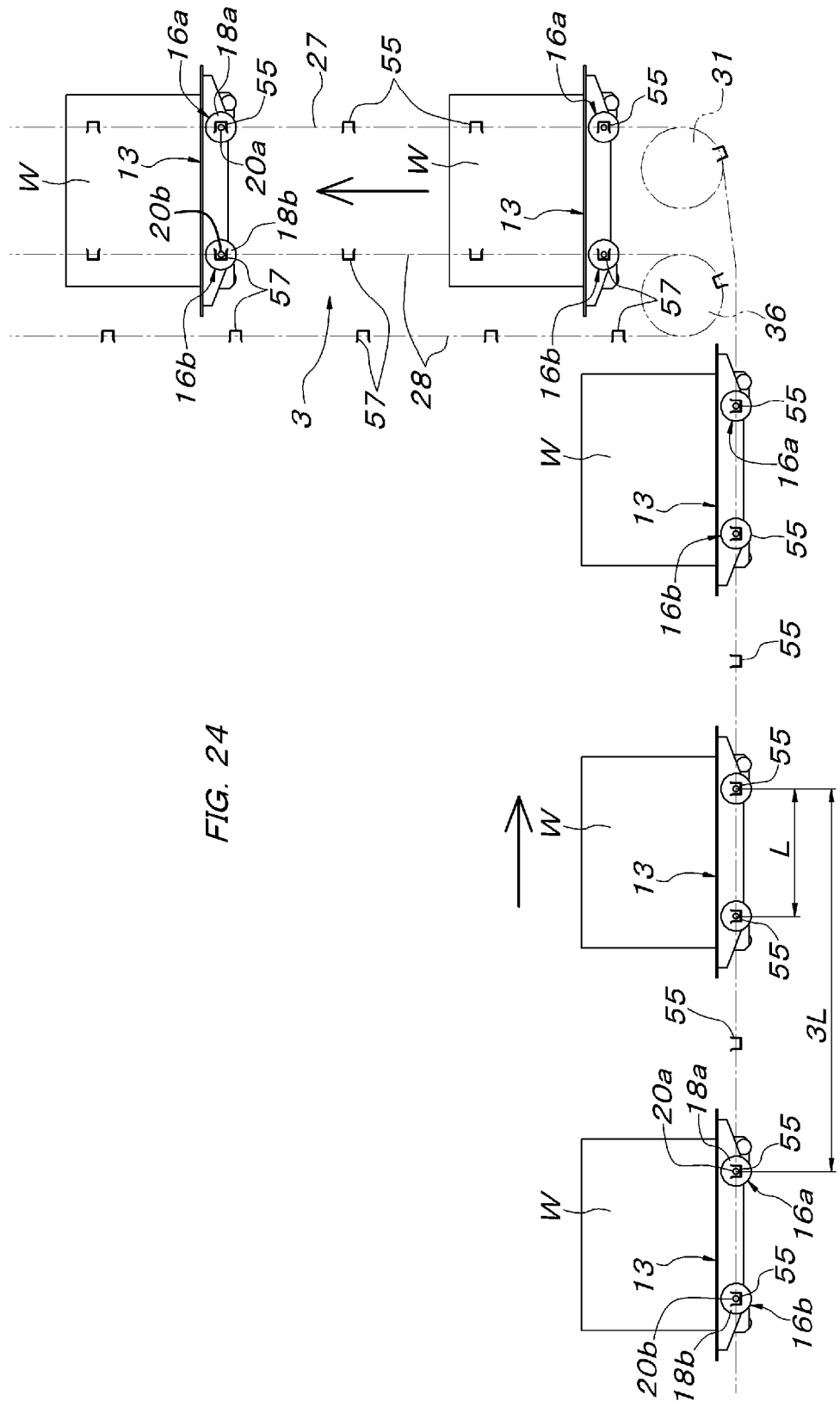

CART-TYPE TRANSPORTING DEVICE

FIELD OF INVENTION

The present invention relates to a cart-type transporting device in which a transporting cart travels from one of a horizontal pathway section and a vertical pathway section in a traveling pathway to the other while keeping a horizontal upright posture.

BACKGROUND OF THE INVENTION

In the cart-type transporting device described above, a pair of left and right first endless chains are stretched so as to be continuous from one of the horizontal pathway section and a lifting/lowering pathway section to the other, in the lifting/lowering pathway section, a pair of left and right second endless chains are stretched which are aligned in parallel to the pair of left and right first endless chains and which rotate in an interlocking manner with the first endless chains, in the first endless chain and the second endless chain, engaging parts are provided which move up and lower, in the lifting/lowering pathway section, at the same height in the same direction parallel to each other, on both left and right sides of a transporting cart, engaged parts are provided which engage with the engaging parts of the first endless chain and the engaging parts of the second endless chain that move up and lower, in the lifting/lowering pathway section, at the same height in the same direction parallel to each other, and in the horizontal pathway section, the engaged parts of the transporting cart engage with the engaging part of the first endless chain to be driven. The cart-type transporting device configured as described above is known in Japanese unexamined patent application publication No. 2011-79624 (Patent Literature 1) and the like.

SUMMARY OF THE INVENTION

In such a cart-type transporting device, since the transporting carts travel at regular intervals, for example, in a case where the transporting cart moves up from the horizontal pathway section to the vertical pathway section through a turning pathway section, in the transporting cart which started to move up through the turning pathway section, a movement distance in an advancing direction per unit time becomes shorter than a movement distance in the advancing direction per unit time when the transporting cart travels the horizontal pathway section, with the result that the interval between the transporting cart which started to move up through the turning pathway section and a transporting cart directly behind the transporting cart which still travels forward on the horizontal pathway section is narrowed. Hence, in order to prevent front and rear transporting carts from interfering with each other in the entrance region of the turning pathway section, the height of the transporting cart and the shape of side surfaces at both front and rear ends are designed, and the interval between the front and rear transporting carts in the horizontal pathway section is set.

Since a load is naturally loaded on the transporting cart, if the interval between the front and rear transporting carts in the horizontal pathway section is set based on the height of the transporting cart without a load loaded thereon, in a case where a load is loaded on the transporting cart, in the entrance/exit region of the turning pathway section, one of the front and rear transporting carts disadvantageously collides against the load on the other transporting cart. Hence, for this type of cart-type transporting device, it is necessary to set the interval between the front and rear transporting carts in the horizontal pathway section based on the height of the entire transporting cart including a load to be handled. In other words, since the interval between the front and rear transporting carts in the horizontal pathway section is set under the assumption of a case where a load having the maximum height among loads to be handled is transported, in a case where a load having a lower height is handled, the efficiency of the transport is lowered.

The present invention provides a cart-type transporting device which can solve the conventional problems described above, and for ease of understanding of a relationship with an embodiment which will be described later, the cart-type transporting device according to the present invention will be shown below with reference symbols which are used in the description of the embodiment and which are placed in parentheses. In the cart-type transporting device in which a pair of left and right first endless chains (27) are stretched so as to be continuous from one of a horizontal pathway section (1) and a lifting/lowering pathway section (3) connected to each other via a turning pathway section (2) to the other, in the lifting/lowering pathway section (3), a pair of left and right second endless chains (28) are stretched which are aligned in parallel to the pair of left and right first endless chains (27) and which rotate in an interlocking manner with the first endless chains (27), in the first endless chain (27) and the second endless chain (28), engaging parts (55, 57) are provided which move up and lower, in the lifting/lowering pathway section (3), at the same height in the same direction parallel to each other, on both left and right sides of a transporting cart (13), two front and rear engaged parts (16a, 16b/17a, 17b) are provided which engage with the engaging parts (55) of the first endless chain (27) and the engaging parts (57) of the second endless chain (28) that move up and lower, in the lifting/lowering pathway section (3), at the same height in the same direction parallel to each other, and in the horizontal pathway section (1), the engaged parts (16a, 16b/17a, 17b) of the transporting cart (13) is configured to engage with the engaging part (55) of the first endless chain (27), in the first endless chain (27), the engaging parts (55) to which the two front and rear engaged parts (16a, 16b/17a, 17b) of the transporting cart (13) are simultaneously fitted are provided at appropriate intervals, the engaging parts (55) of the first endless chain (27) and the engaged parts (16a to 17b) of the transporting cart (13) are detachably fitted together to and from each other such that in the horizontal pathway section (1), the transporting carts (13) can be attached/detached in a vertical direction, and in the horizontal pathway section (1), the engaging parts (55) on the side of the first endless chain (27) to which the engaged parts (16a to 17b) of the transporting cart (13) are fitted are changed according to the height of a load (W) that is loaded on the transporting cart (13) such that an interval between the transporting carts (13) can be changed in the horizontal pathway section (1).

The above-described basic Configuration A according to the present invention can be embodied and practiced as follows.

"Configuration B"

The respective engaged parts (16a to 17b) of the transporting cart (13) can be formed with wheels (18a to 19b) which are pivotally supported at four places of the transporting cart (13), that is, front and rear and left and right places, and projection shafts (20a to 21b) which are concentrically protruded from the wheels (18a to 19b).

"Configuration C"

The respective engaging parts (55) of the first endless chain (27) are provided so as to protrude, in the horizontal pathway section, inward from the first endless chain (27), and include concave parts (56) to which the projection shafts (20a to 21b) of the respective engaged parts (16a to 17b) of the transporting cart (13) are detachably fitted in the vertical direction in the horizontal pathway section, and as with the engaging parts (55) of the first endless chain (27) which are directed horizontally laterally in a vertical pathway section (3), the engaging parts (57) of the second endless chain (28) are provided on the inner side of the second endless chain (28) so as to protrude, and include concave parts (59) which are formed to be directed horizontally laterally such that the projection shafts (20a to 21b) of the respective engaged parts (16a to 17b) of the transporting cart (13) are fitted to the concave parts (59) in a horizontal lateral direction. The Configuration C is practiced in combination with the Configuration B.

"Configuration D"

All the engaging parts (55) of the first endless chain (27) are aligned at regular intervals equal to intervals between the engaged parts (16a to 17b) of the transporting cart (13) in a forward and backward direction. The Configuration C can be practiced in combination with at least one of the Configurations A to C.

In the configuration of the present invention described above, the interval in the traveling direction between the transporting carts in the horizontal pathway section is not fixed to a constant interval, but the interval in the traveling direction between the transporting carts in the horizontal pathway section can be changed by determining stepwise according to the arrangement of the engaging parts included in the first endless chain. Moreover, its operation is performed by only selecting the engaging parts on the side of the first endless chain to which the engaged parts of the transporting cart are selectively changed when all the transporting carts are placed and set on the horizontal pathway section from above, and thus it is possible to perform the operation significantly simply and easily. Hence, when the height of a load to be handled is low, the interval in the traveling direction between the transporting carts in the horizontal pathway section is narrowed, and thus the efficiency of the transport can be enhanced whereas when the height of a load to be handled is high, the interval in the traveling direction between the transporting carts in the horizontal pathway section is increased, and thus it is possible to prevent an accident, such as, in which the entrance and exit of the turning pathway section, one of the preceding transporting cart and the subsequent transporting cart collides against a load having a high height loaded on the other transporting cart. In the present invention, regardless of the relationship of upper and lower positions between the lifting/lowering pathway section and the horizontal pathway section and the traveling direction when the transporting cart passes between the horizontal pathway section and the lifting/lowering pathway section, it is possible to solve the problem when the transporting cart on which a load is loaded travels and passes the turning pathway section between the horizontal pathway section and the lifting/lowering pathway section.

In a case where the present invention is practiced, if the Configuration B described above is adopted, in a case where the engaged parts of the transporting cart is transferred between auxiliary rotating bodies necessary for the turning pathway section, that is, the engaging part of the first endless chain and the engaging part of the second endless chain, it is possible to configure the turning pathway section by selecting, depending on the situation, which of the wheels and the projection shafts can be used without any problem. In this case, it is preferable to combine the Configuration C described above. Furthermore, by practicing the present invention in combination with the Configuration D described above, as compared with a case where the two engaging parts at the interval equal to the interval between the engaged parts of the transporting cart in the forward and backward direction are formed as one pair and where the two engaging parts of each pair are aligned at an arbitrary interval different from the interval between the engaged parts of the transporting cart in the forward and backward direction, an operation for confirming the target engaging parts necessary when setting the transporting cart on the horizontal pathway section is simply and easily performed.

BRIEF DESCRIPTION OF THE DRAWINGS

FIG. 2A is a side view showing a transporting cart and its drive endless chain; FIG. 2B is a bottom view of the transporting cart; and FIG. 2C is a cross-sectional view taken along line X-X of FIG. 2B.

FIG. 5A is a partial vertical cross-sectional front view showing a state where the transporting cart is transferred to a first horizontal pathway section; and FIG. 5B is a vertical cross-sectional front view of an endless chain turning part in the first turning pathway section.

FIG. 24 is a schematic side view showing, in a case where the transporting carts are aligned with a pitch having a length of the 1.5 times the basic pitch, the transporting cart which passes from the first horizontal pathway section through the second turning pathway section to the first lifting/lowering pathway section.

DETAILED DESCRIPTION OF THE INVENTION

Figure 1:
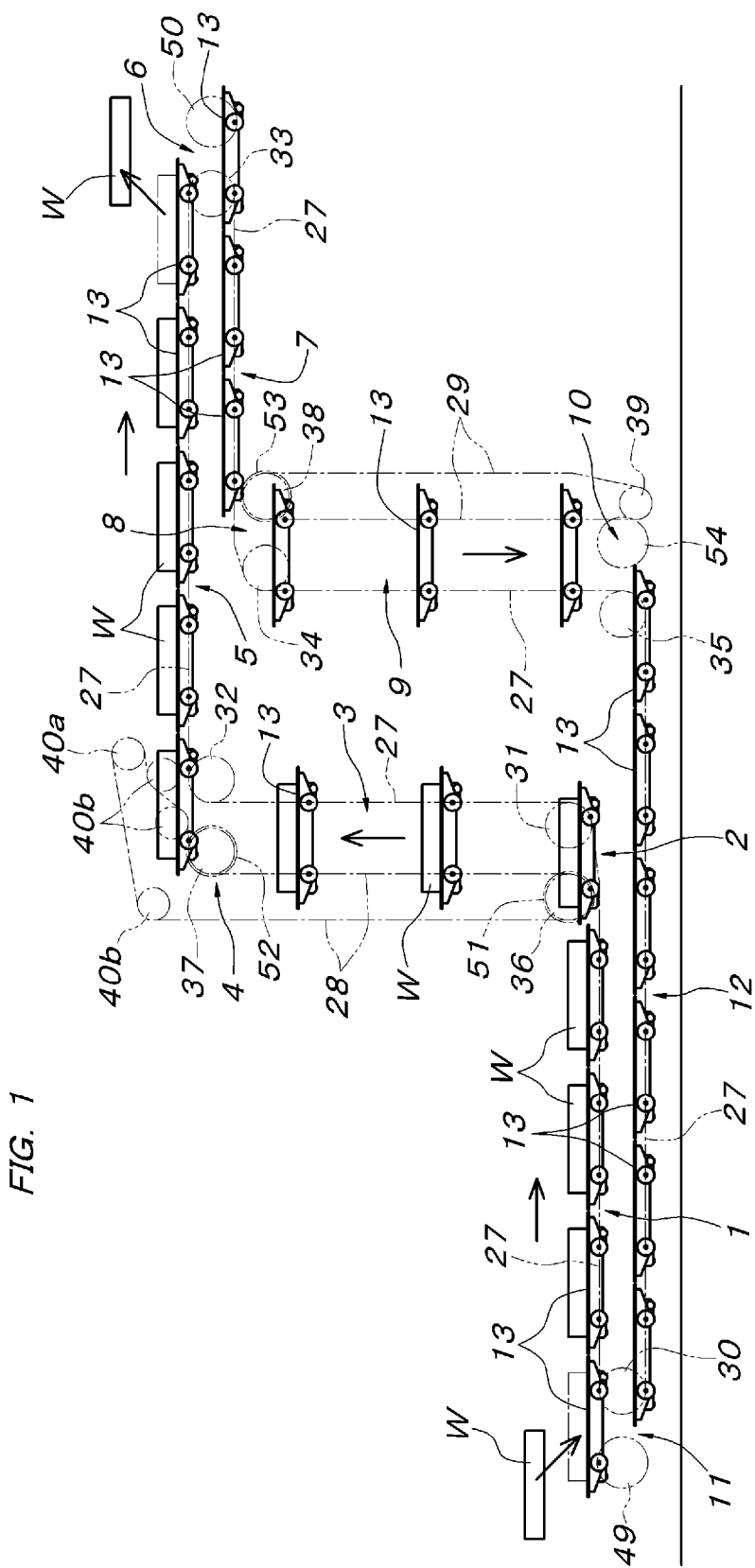
FIG. 1 is a schematic side view showing a transporting cart traveling pathway and a drive endless chain in an entire transporting device.
Figure 3:
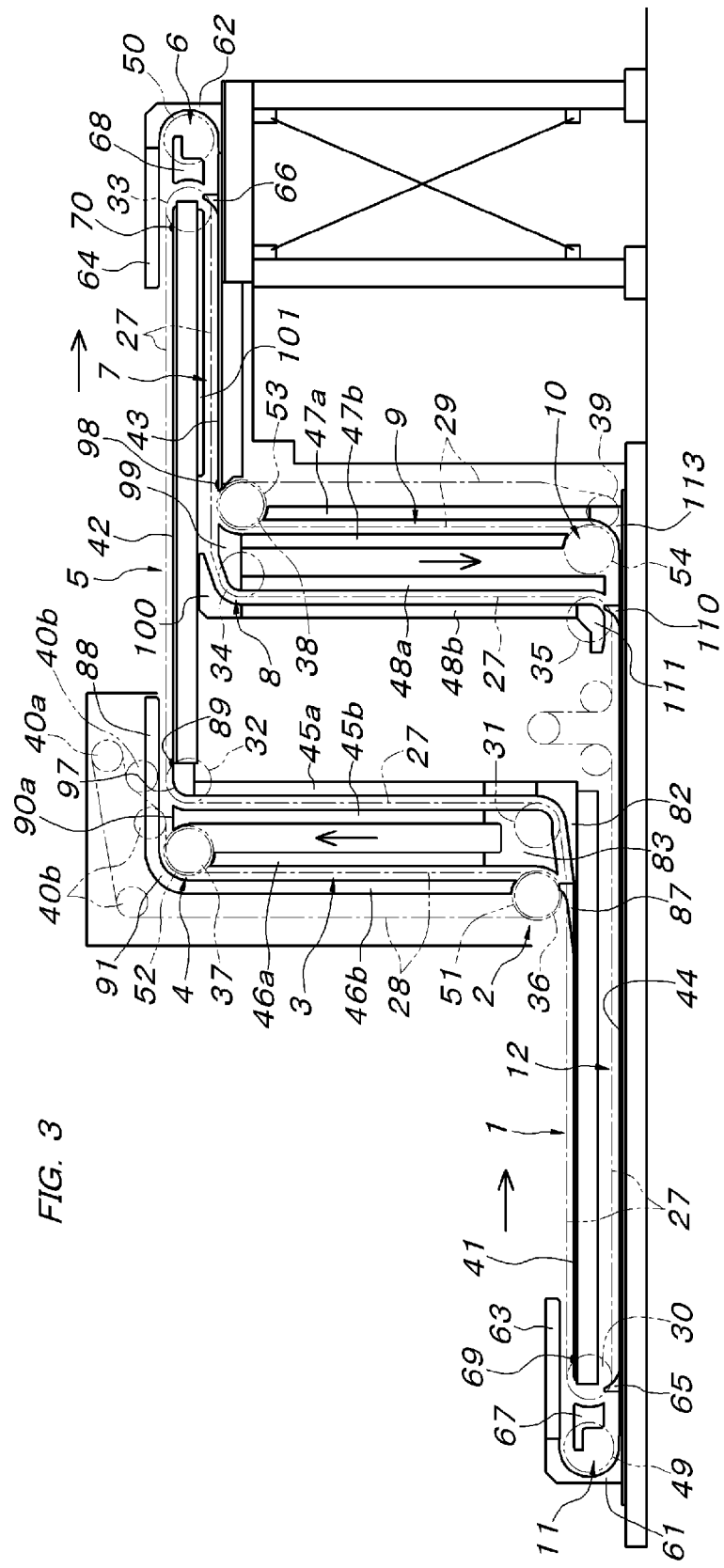
FIG. 3 is a schematic side view showing an arrangement related to guide rails of the entire transporting device.
Figure 4:
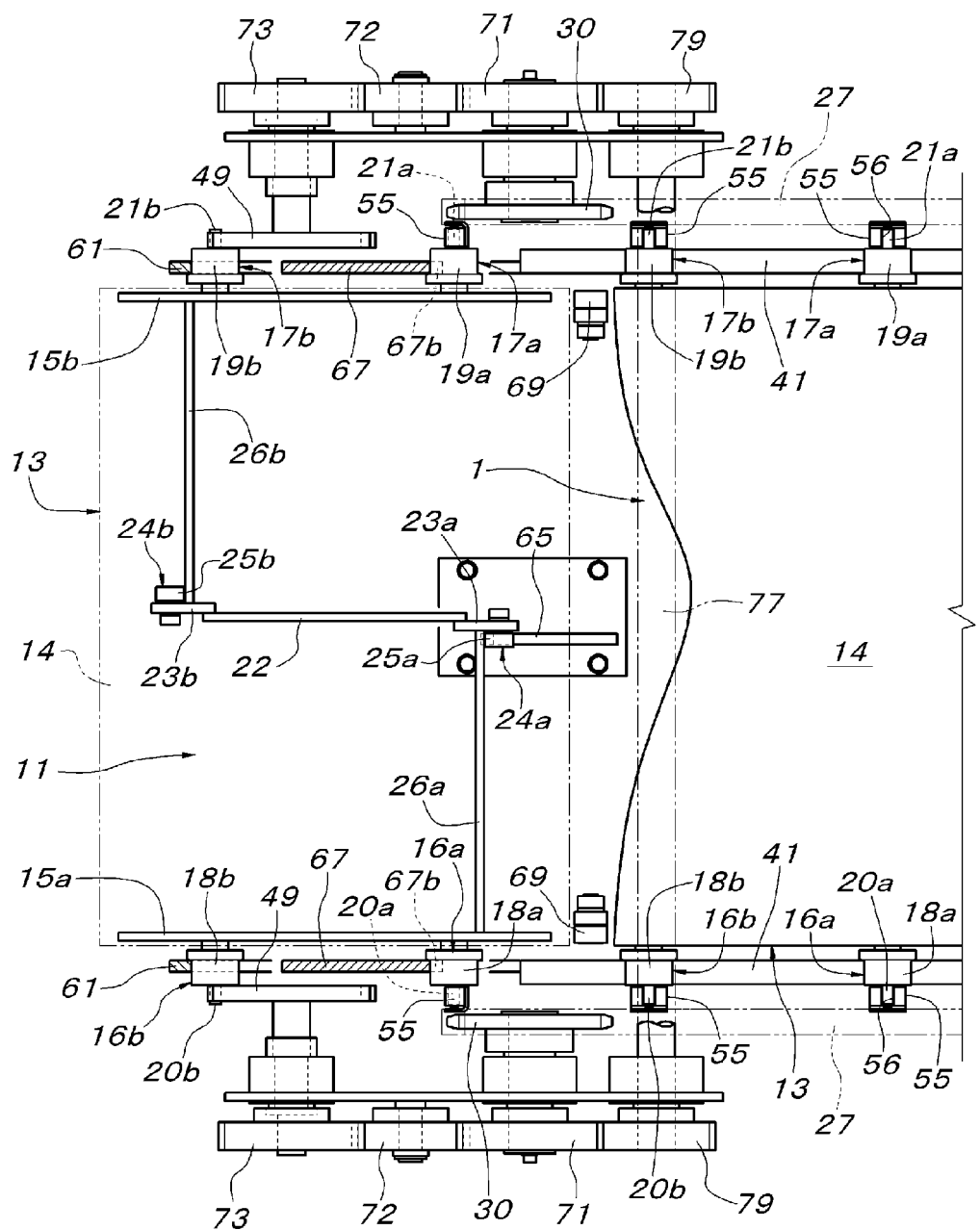
FIG. 4 is a partial cutaway plan view illustrating a first turning pathway section.

An embodiment of the present invention will be described below with reference to accompanying drawings. As shown in FIGS. 1 and 3, a transporting device of the embodiment is formed with: a low-position first horizontal pathway section 1; a first lifting/lowering pathway section 3 which is connected upward to one end of the first horizontal pathway section 1 via a first turning pathway section 2; a high-position second horizontal pathway section 5 which is arranged on the opposite side to the side where the first horizontal pathway section 1 is present with respect to the first lifting/lowering pathway section 3 and which is connected to the upper end of the first lifting/lowering pathway section 3 via a second turning pathway section 4; a third horizontal pathway section 7 which overlaps the lower side of the second horizontal pathway section 5 and which is connected to the free end of the second horizontal pathway section 5 via a third turning pathway section 6; a second lifting/lowering pathway section 9 which is connected downward to the free end of the third horizontal pathway section 7 via a fourth turning pathway section 8; and a fourth horizontal pathway section 12 which overlaps the lower side of the first horizontal pathway section 1, in which one end is connected to the lower end of the second lifting/lowering pathway section 9 via a fifth turning pathway section 10 and in which the other end is connected to the free end of the first horizontal pathway section 1 via a sixth turning pathway section 11. The transporting pathway along which a load W is transported by a transporting cart 13 of the transporting device is the first horizontal pathway section 1→the first lifting/lowering pathway section 3→the second horizontal pathway section 5, and the emptied transporting cart 13 is returned to the beginning end part of the first horizontal pathway section 1 through the third horizontal pathway section 7→the second lifting/lowering pathway section 9→the fourth horizontal pathway section 12.

It is a matter of course that, by reversing the flow of the transporting cart 13, the transporting pathway of the load W by the transporting cart 13 can be the second horizontal pathway section 5→the first lifting/lowering pathway section 3→the first horizontal pathway section 1. In any case, in the first turning pathway section 2 to the sixth turning pathway section 11, the transporting cart 13 is turned in the shape of an arc while keeping a horizontal upright posture, and thus the transporting cart 13 travels in all the pathway sections while keeping the horizontal upright posture.

In the transporting cart 13, as shown in FIG. 2, side plates 15a and 15b are fixed so as to be continuous to the lower sides of both the left and right sides of a top plate 14 whose planar shape is rectangular, and engaged parts 16a to 17b are provided at two front and rear places on the outer sides of both the left and right side plates 15a and 15b. The respective engaged parts 16a to 17b are formed with: wheels 18a to 19b which are supported by support shafts in a left/right horizontal direction; and projection shafts 20a to 21b which are concentrically provided so as to protrude outward from the respective wheels 18a to 19b. The respective projection shafts 20a to 21b can be formed by protruding, from the wheels, the support shafts supporting the wheels 18a to 19b. The two front and rear pairs of left and right wheels 18a and 19a and left and right wheels 18b and 19b are arranged concentrically with respect to each other.

On the bottom part of the top plate 14, a center reinforcement plate 22 in a forward/backward direction is attached to a center position in its left/right width direction, and bearing plates 23a and 23b are attached to the left and right side surfaces of the center reinforcement plate 22 on the opposite sides at both front and rear ends thereof and to the top plate 14, and auxiliary supported parts 24a and 24b are attached to the opposite sides of both the bearing plates 23a and 23b to the sides where the reinforcement plate 22 is present. These auxiliary supported parts 24a and 24b are respectively formed with cam-following rollers 25a and 25b which are supported by support shafts in the left/right horizontal direction, and the cam-following rollers 25a and 25b have a sufficiently smaller diameter than the wheels 18a to 19b and are arranged so as not to protrude beyond the lower sides of the wheels 18a to 19b and so as to be separated downward from the top plate 14 as much as possible. Lateral reinforcement plates 26a and 26b whose height is low are fixed to the sides where the cam-following rollers 25a and 25b of the respective bearing plates 23a and 23b are present and between the side surfaces more inward than the cam-following rollers 25a and 25b and both the left and right side plates 15a and 15b so as to be parallel to the left/right width direction of the top plate 14. In the configuration described above, a space under the top plate between the cam-following roller 25a on the front side and the rear end of the top plate 14 is opened in its lower side and is also opened backward, and at least the lower half portion of the cam-following roller 25a on the front side can be directly viewed from the rear of the transporting cart 13, and a space under the top plate between the cam-following roller 25b on the rear side and the front end of the top plate 14 is opened in its lower side and is also open forward, and at least the lower half portion of the cam-following roller 25b on the rear side can be directly viewed from the front of the transporting cart 13.

As shown in FIG. 1, along an endless transporting cart traveling pathway which starts from the low-position first horizontal pathway section 1 through the first lifting/lowering pathway section 3, the high-position second horizontal pathway section 5, the third horizontal pathway section 7, the second lifting/lowering pathway section 9 and the fourth horizontal pathway section 12 then returns to the original first horizontal pathway section 1, a first endless chain 27 is stretched. In the first lifting/lowering pathway section 3, since the first endless chain 27 is vertically stretched on the side far from the first horizontal pathway section 1, a second endless chain 28 is vertically stretched on the side close to the first horizontal pathway section 1 so as to pair with the vertical first endless chain 27 of the first lifting/lowering pathway section 3. In the second lifting/lowering pathway section 9, since the first endless chain 27 is vertically stretched on the side close to the first horizontal pathway section 1, a second endless chain 29 is vertically stretched on the side far from the first horizontal pathway section 1 so as to pair with the vertical first endless chain 27 of the second lifting/lowering pathway section 9. The horizontal interval between the vertical first endless chains 27 of the first lifting/lowering pathway section 3 and the second lifting/lowering pathway section 9 and the vertical second endless chains 28 and 29 which pair with the first endless chains 27 and which move in the same direction as the first endless chains 27 are equal to the interval between the engaged parts 16a and 16b and 17a and 17b which pair with each other in the forward and backward direction of the transporting cart 13 (hereinafter referred to as support intervals for the transporting cart 13).

The first endless chain 27 is stretched so as to start from a turning-part toothed wheel 30 which is pivotally supported by the sixth turning pathway section 11 through a turning-part toothed wheel 31 which is pivotally supported on the outer side of the first turning pathway section 2, a turning-part toothed wheel 32 which is pivotally supported on the inner side of the second turning pathway section 4, a turning-part toothed wheel 33 which is pivotally supported by the third turning pathway section 6, a turning-part toothed wheel 34 which is pivotally supported on the outer side of the fourth turning pathway section 8 and a turning-part toothed wheel 35 which is pivotally supported on the inner side of the fifth turning pathway section 10 then returns to the original turning-part toothed wheel 30; the second endless chain 28 is vertically stretched via a lower end guide toothed wheel 36 which is pivotally supported on the inner side of the first turning pathway section 2 and an upper end guide toothed wheel 37 which is pivotally supported on the outer side of the second turning pathway section 4; and the second endless chain 29 is vertically stretched via an upper end guide toothed wheel 38 which is pivotally supported on the inner side of the fourth turning pathway section 8 and a lower end guide toothed wheel 39 which is pivotally supported on the outer side of the fifth turning pathway section 10. In a turning part on the side of the upper end of the second endless chain 28, a take-up toothed wheel 40a and a plurality of guide toothed wheels 40b for guiding the second endless chain 28 thereto are also provided.

As shown in FIG. 3, in the respective pathway sections, various types of guide rails and the like are also provided which allow the transporting cart 13 to travel while keeping the horizontal upright posture. A schematic configuration will be described with reference to FIG. 3. Over the respective horizontal pathway sections 1, 5, 7 and 12, horizontal guide rails 41 to 44 for supporting and guiding the wheels 18a to 19b of the transporting cart 13 are laid. On the respective lifting/lowering pathway sections 3 and 9, front and rear pairs of vertical guide rails 45a and 45b and 46a and 46b which sandwich the wheels 18a and 19a on the front side of the transporting cart 13 that is lifted or lowered so as to prevent swinging and front and rear pairs of vertical guide rails 47a and 47b and 48a and 48b which sandwich the wheels 18b and 19b on the rear side so as to prevent swinging are laid. The sixth turning pathway section 11 and the third turning pathway section 6 have a front/rear symmetric structure, and a pair of left and right auxiliary rotating bodies 49 and 50 are respectively provided therein that are pivotally supported in positions which are separated outward and horizontally with respect to the turning-part toothed wheels 30 and 33 on the inner side and which are separated by only the support interval for the transporting cart 13 apart. Furthermore, in the lower end guide toothed wheel 36 which engages with the second endless chain 28 of the first turning pathway section 2, the upper end guide toothed wheel 37 which engages with the second endless chain 28 of the second turning pathway section 4 and the upper end guide toothed wheel 38 which engages with the second endless chain 29 of the fourth turning pathway section 8, auxiliary rotating bodies 51 to 53 are provided concentrically on the inner side thereof, and an auxiliary rotating body 54 is pivotally supported in a position which is separated outward from the turning-part toothed wheel 35 which engages with the first endless chain 27 of the fifth turning pathway section 10 and which is separated by only the support interval for the transporting cart apart.

All the endless chains 27 to 29 described above are stretched so as to be located on both the left and right sides of the traveling pathway of the transporting cart 13 and to form left and right pairs. Hence, all the toothed wheels 30 to 40b and the respective auxiliary rotating bodies 49 to 54 which engage with these endless chains are also concentrically and pivotally supported so as to be located on both the left and right sides of the traveling pathway of the transporting cart 13 and to form left and right pairs. Naturally, various types of guide rails, such as the horizontal guide rails 41 to 44 and the vertical guide rails 45a to 48b, which are provided in an auxiliary manner are also provided so as to be located on both the left and right sides of the transporting cart 13 and to form left and right pairs.

To the first endless chain 27, as shown in FIGS. 2A and 4 to 7, engaging parts 55 are attached at regular intervals equal to the support interval for the transporting cart 13. Each of the engaging parts 55 is formed with a member that has a concave part 56 to which the projection shafts 20a to 21b of the respective engaged parts 16a to 17b of the transporting cart 13 can be fitted so as to freely rotate relatively and to be detachably fitted, and in the first horizontal pathway section 1 and the second horizontal pathway section 5, the engaging parts 55 are provided on the inner side of the first endless chain 27 in such a direction that the concave parts 56 of the engaging parts 55 are open upward and that the projection shafts 20a to 21b of the respective engaged parts 16a to 17b of the transporting cart 13 can be fitted from above. The total length of the transporting cart 13 is slightly shorter than twice the length of the support interval for the transporting cart 13. Hence, as shown in FIG. 1, on the horizontal pathway sections 1, 5, 7 and 12, the respective transporting carts 13 can be engaged with the first endless chain 27 such that the respective transporting carts 13 are adjacent and continuous forward and backward via the respective engaged parts 16a to 17b of the transporting cart 13 and the respective engaging parts 55 of the first endless chain 27. In the respective second endless chains 28 and 29, as shown in FIGS. 8 to 12 and 18 to 22, engaging parts 57 and 58 are provided in a symmetric orientation at the same height as the respective engaging parts 55 of the first endless chain 27 aligned in parallel in the respective lifting/lowering pathway sections 3 and 9. It is a matter of course that the engaging parts 57 and 58 have the same structure as the engaging parts 55, and are formed with a member that has concave parts 59 and 60 to which the projection shafts 20a to 21b of the respective engaged parts 16a to 17b of the transporting cart 13 can be fitted.

The configuration of each of the turning pathway sections will be specifically described below. As shown in FIGS. 4 to 7 and 13 to 16, the sixth turning pathway section 11 and the third turning pathway section 6 have a front/rear symmetric structure, and the reference symbols of the third turning pathway section 6 are also provided by placing them in parentheses. The auxiliary rotating body 49 (50) has, on both sides in a diameter direction, engaging parts 49a and 49b (50a and 50b) that are formed with concave parts to which the projection shafts 20a to 21b of the respective engaged parts 16a to 17b of the transporting cart 13 can be fitted and that are directed outward; along the outer semicircular region of the rotation path of the auxiliary rotating body 49 (50), an outer semicircular guide rail 61 (62) is provided; an upper horizontal guide rail 63 (64) which has such a length so as to cover from the upper end of the outer semicircular guide rail 61 (62) to the end part region of a horizontal guide rail 41 (42) is continuously provided; and the lower end of the outer semicircular guide rail 61 (62) is connected to a horizontal guide rail 43 (44). In a center part in the left/right width direction below the turning-part toothed wheel 30 (33), a lower protruding cam 65 (66) which acts on the cam-following roller 25a (25b) on the bottom part of the transporting cart 13 and which has an arc-shaped cam surface is provided so as to locate below the movement path of the top plate 14 of the transporting cart 13 entering and exiting between the horizontal pathway section 12 (7) on the lower side and the turning pathway section 11 (6) and to protrude upward from the side of a floor surface.

Furthermore, over the side where the auxiliary rotating body 49 (50) is present with respect to the turning-part toothed wheel 30 (33), an intermediate guide rail 67 (68) is laid, and in the intermediate guide rail 67, an auxiliary horizontal guide rail part 67a (68a) at the same level as the horizontal guide rail 41 (42) of the horizontal pathway section 1 (5) and an arc-shaped guide rail part 67b (68b) along the turning-part toothed wheel 30 (33) are formed. On the outer semicircular guide rail 61 (62), the upper horizontal guide rail 63 (64) and the intermediate guide rail 67 (68), the wheels 18a to 19b of the engaged parts 16a to 17b on both the left and right sides of the transporting cart 13 are rolled and moved, and pairs of the left and right guide rails are provided so as to be located on both the left and right sides of the traveling pathway of the transporting cart 13, respectively. In a position adjacent to the turning-part toothed wheel 30 (33) of the horizontal guide rail 41 (42), an auxiliary support guide roller 69 (70) which supports both the left and right side plates 15a and 15b of the transporting cart 13 is pivotally supported.

Figure 13:
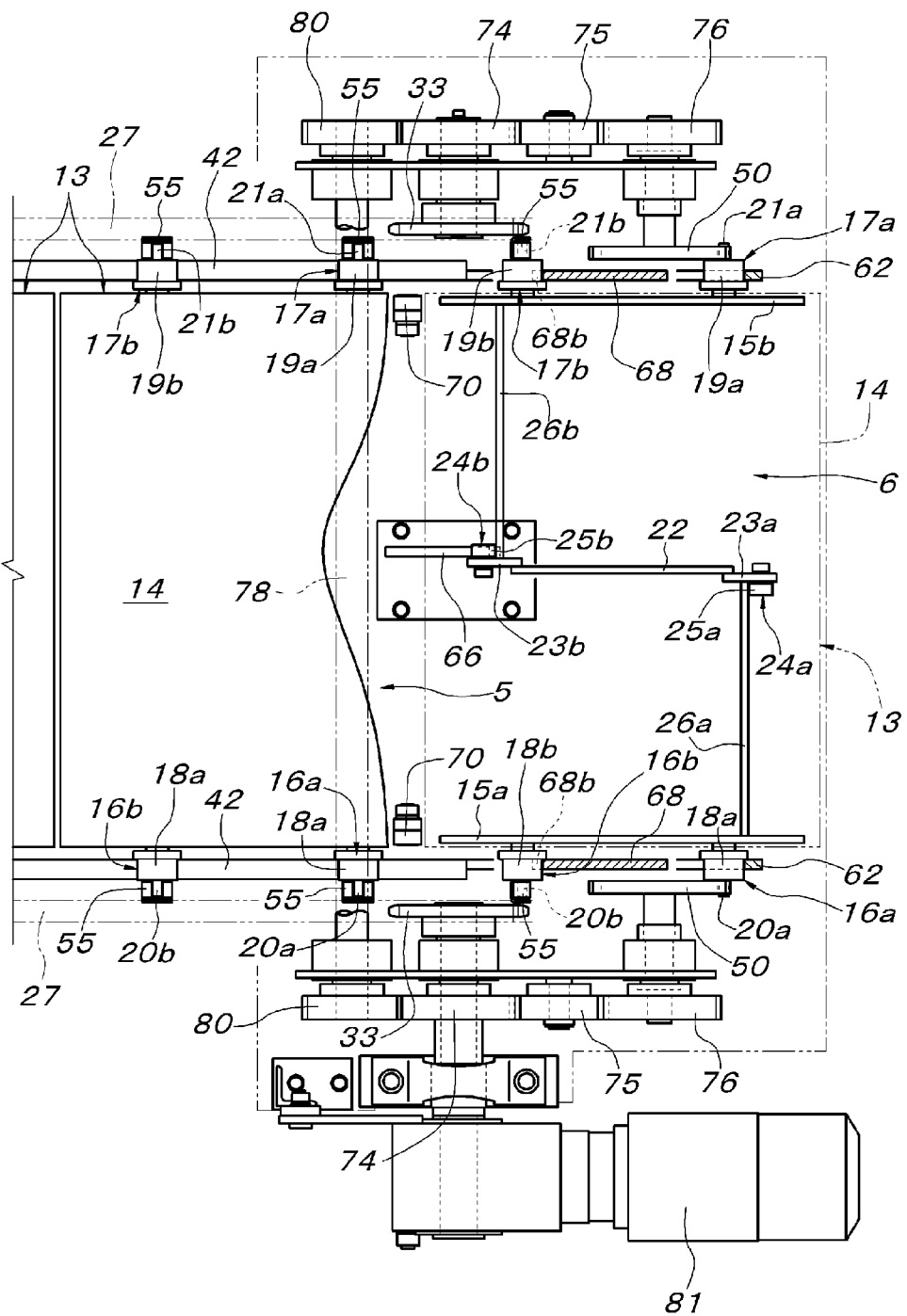
FIG. 13 is a partial cutaway plan view illustrating a fourth turning pathway section.
Figure 14:
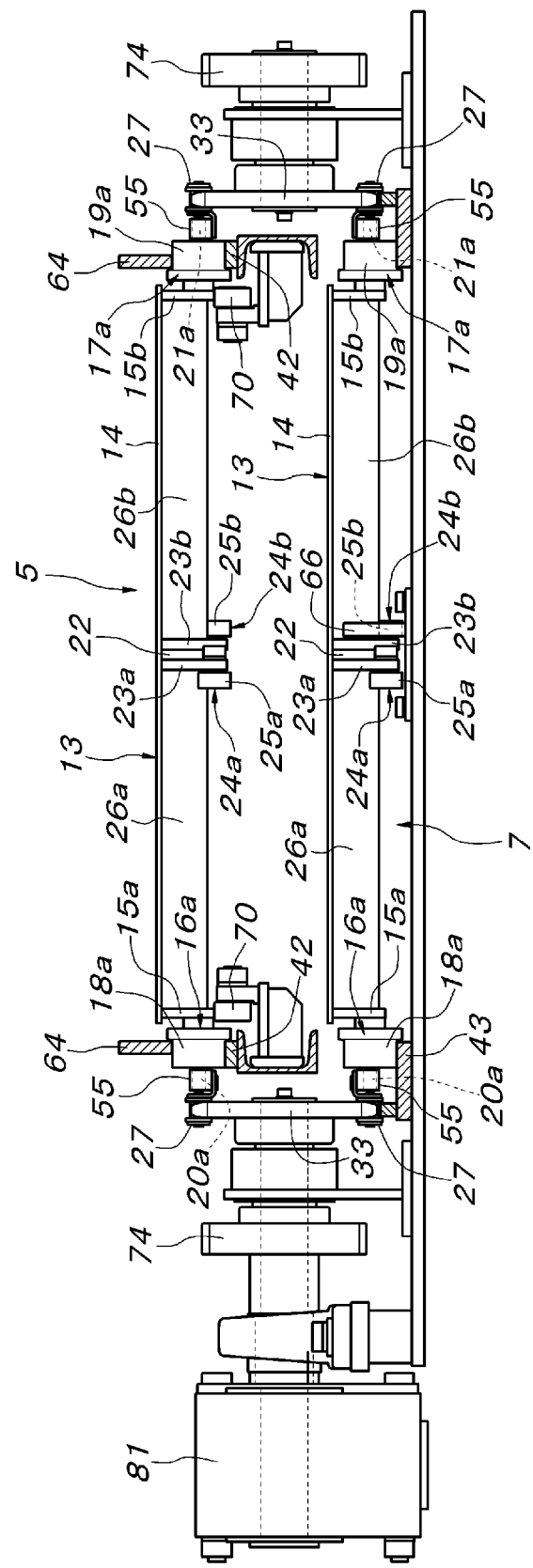
FIG. 14 is a vertical cross-sectional front view of an endless chain turning part in the fourth turning pathway section.
Figure 15A:
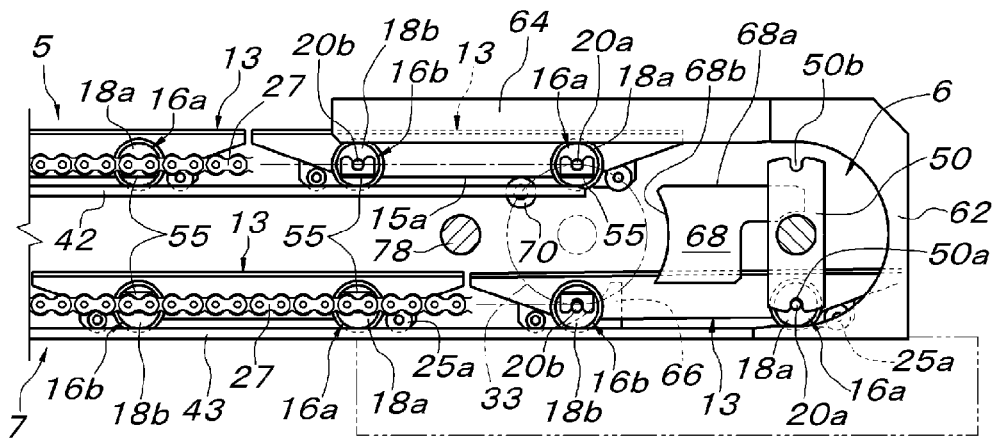
FIG. 15A is a side view of a first stage illustrating the travel of the transporting cart from the second horizontal pathway section through the fourth turning pathway section to a third horizontal pathway section.
Figure 15B:
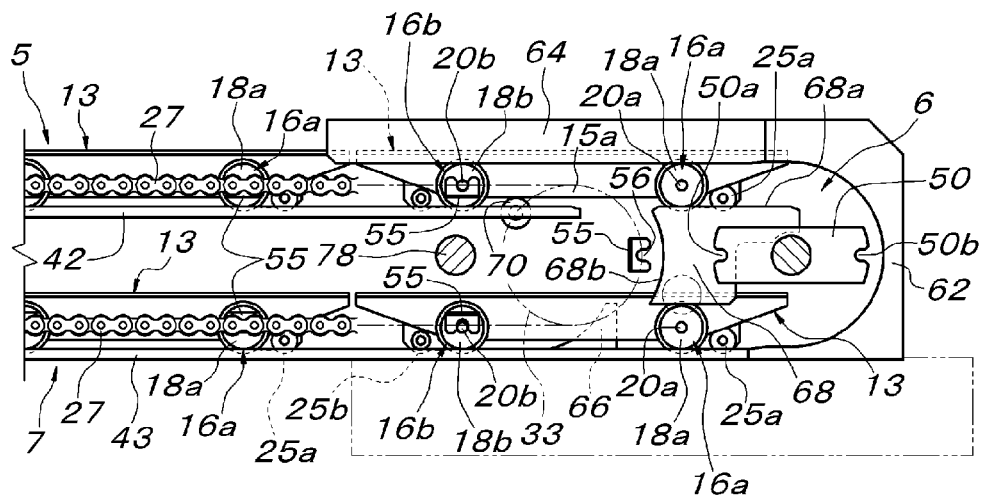
FIG. 15B is a side view of a second stage thereof.
Figure 15C:
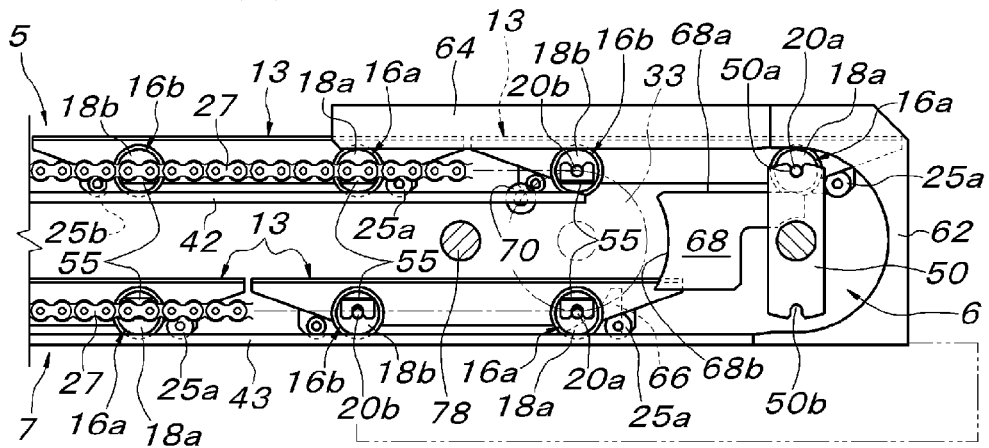
FIG. 15C is a side view of a third stage thereof.
Figure 16A:
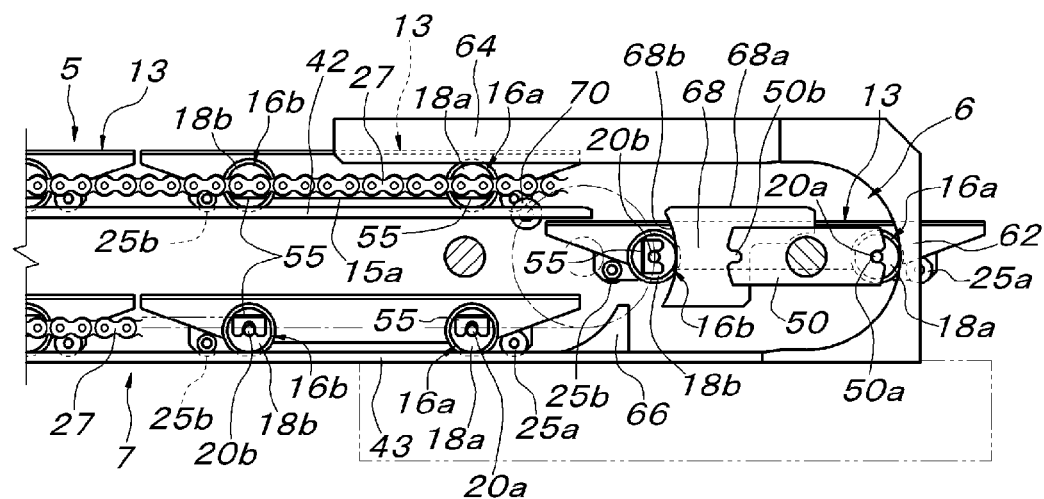
FIG. 16A is a side view of a fourth stage thereof.
Figure 16B:
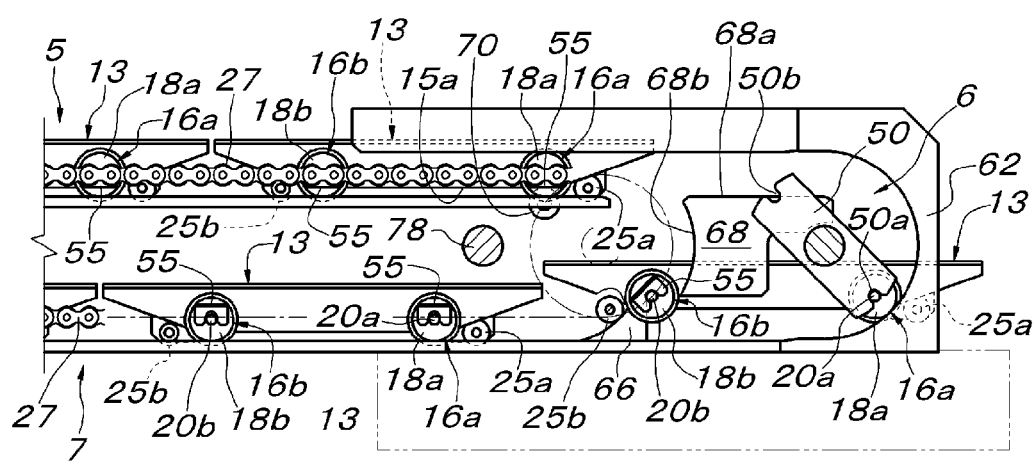
FIG. 16B is a side view of a fifth stage thereof.

The turning-part toothed wheel 30 (33) is driven to rotate by the engagement with the endless chain 27; the turning-part toothed wheel 30 (33) and the auxiliary rotating body 49 (50) on the same left and right sides are coupled with spur gear trains 71 to 73 (74 to 76) in an interlocking manner so as to rotate at the same speed in the same direction as each other; and one transmission shaft 77 (78) and a spur gear 79 (80) meshing with one of the spur gear trains 71 to 73 (74 to 76) are provided such that the turning-part toothed wheel 30 (33) and the auxiliary rotating body 49 (50) on both the left and right sides rotate synchronously. The transmission shaft 77 (78) crosses between the first horizontal pathway section 1 (the second horizontal pathway section 5) and the fourth horizontal pathway section 12 (the third horizontal pathway section 7). Then, as shown in FIGS. 13 and 14, the support shaft of the turning-part toothed wheel 33 on one side of the pair of left and right turning-part toothed wheels 33 in the third turning pathway section 6 is extended outward and is directly connected to the output shaft of a speed reducer equipped motor 81 and the pair of left and right first endless chains 27 rotate at a constant speed by the operation of the speed reducer equipped motor 81 over all the traveling pathways.

The auxiliary rotating bodies 49a and 50 are positioned, outward of the turning-part toothed wheels 30 and 33, by only the support interval for the transporting cart 13 apart horizontally, and rotate in an interlocking manner in the same direction as the turning-part toothed wheels 30 and 33 via the gear mechanism described above; the rotation radius of the engaging parts 49a and 49b and 50a and 50b at both ends thereof is equal to the rotation radius of the engaging parts 55 of the first endless chain 27 which rotate around the turning-part toothed wheels 30 and 33; and when the engaging parts 49a and 49b and 50a and 50b at both ends thereof are present on a vertical axis passing through the rotation axial center, the two engaging parts 55 of the first endless chain 27 positioned at intervals equal to the support interval for the transporting cart 13 apart are also present on a vertical axis passing through the rotation axial center of the turning-part toothed wheels 30 and 33.

Figure 6A:
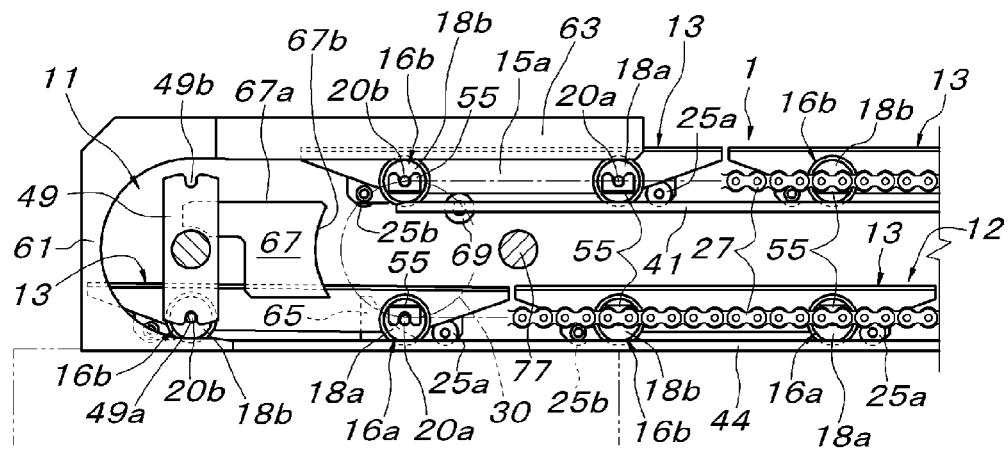
FIG. 6A is a side view of a first stage illustrating the travel of the transporting cart from a fourth horizontal pathway section through the first turning pathway section to the first horizontal pathway section.

In the fourth horizontal pathway section 12, the engaging parts 55 of the first endless chain 27 are downwardly fitted to the respective engaged parts 16a to 17b (the projection shafts 20a to 21b) of the transporting cart 13, the first endless chain 27 is driven by the speed reducer equipped motor 81 and thus the transporting cart 13 supported on the horizontal guide rail 44 via the wheels 18a to 19b can be made to travel horizontally toward the sixth turning pathway section 11. When the transporting cart 13 enters the sixth turning pathway section 11, as shown in FIG. 6A, as the engaging parts 55 rotate upward around the turning-part toothed wheel 30, the engaged parts 16b and 17b on the side of the advancing direction are separated from the engaging parts 55, are pushed from the rear to drive by the engaging parts 55 on the rear side as they are and are made to travel forward. Then, in the process in which the engaged parts 16b and 17b on the side of the advancing direction reach the position directly below the axial center of the auxiliary rotating body 49, the engaging part 49a at one end of the auxiliary rotating body 49 it fitted from above to the engaged parts 16b and 17b on the side of the advancing direction. Thereafter, by the rotation of the turning-part toothed wheel 30 and the auxiliary rotating body 49, the engaged parts 16b and 17b on the side of the advancing direction in the transporting cart 13 are scooped upward by the auxiliary rotating body 49, and simultaneously the engaged parts 16b and 17b on the rear side of the transporting cart 13 are scooped upward synchronously by the engaging parts 55 which rotate around the turning-part toothed wheel 30.

Figure 6B:
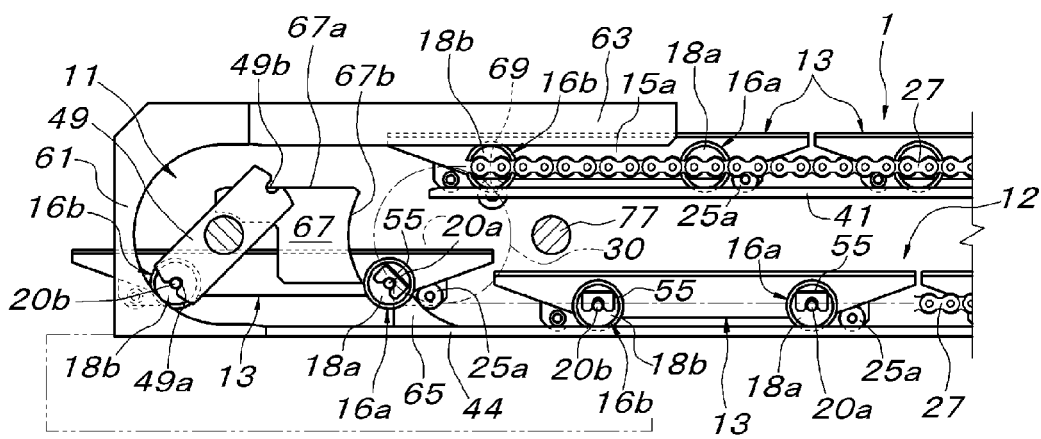
FIG. 6B is a side view of a second stage thereof.

Although at the time of the operation of scooping up the transporting cart 13 described above, from the vertically downward engaging part 49a of the auxiliary rotating body 49 and the vertically downward engaging parts 55 of the first endless chain 27, the engaged parts 16a to 17b of the transporting cart 13 which are respectively fitted thereto tend to be pushed out forward as shown in FIG. 6B, the engaged parts 16b and 17b on the front side are scooped upward by the rotation of the engaging part 49a of the auxiliary rotating body 49 along the outer semicircular guide rail 61 in a state where the engaged parts 16b and 17b are received by the outer semicircular guide rail 61. On the other hand, when the engaged parts 16a and 17a on the rear side of the transporting cart 13 reach the position directly below the rotation axial center of the turning-part toothed wheel 30, since the cam-following roller 25a of the auxiliary supported part 24a located on the rear side of the bottom part of the transporting cart 13 has reached the area directly in front of the lower protruding cam 65, as the transporting cart 13 is scooped up from such a state as described above, the cam-following roller 25a moves upward along the arc-shaped cam surface of the lower protruding cam 65. In other words, the engaged parts 16a and 17a on the rear side are prevented from being pushed out forward from the engaging parts 55 of the first endless chain 27 by the lower protruding cam 65 via the cam-following roller 25a, and thus the transporting cart 13 is reliably scooped upward in a state of being supported horizontally by the engaging part 49a of the auxiliary rotating body 49 and the engaging parts 55 of the first endless chain 27 which rotate at the same level.

Although in the process in which the cam-following roller 25a of the auxiliary supported part 24a located on the rear side of the bottom part of the transporting cart 13 reaches the lower protruding cam 65, the transporting cart 13 needs to pass forward through the position of the lower protruding cam 65, since the space below the top plate 14 in front of the cam-following roller 25a is opened forward at this time, when the height of the lower protruding cam 65 is lower than the height of the bottom surface of the top plate 14, the transporting cart 13 can travel on the lower protruding cam 65 without interfering with each other. At this time, the cam-following roller 25b of the auxiliary supported part 24b on the front side moves through the position on the lateral side of the lower protruding cam 65.

Figure 6C:
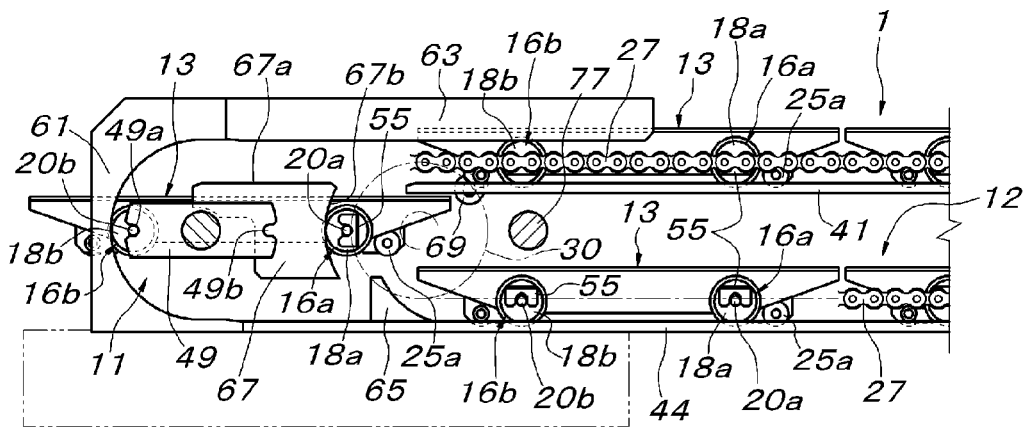
FIG. 6C is a side view of a third stage thereof.

When the cam-following roller 25a of the auxiliary supported part 24a located on the rear side of the bottom part of the transporting cart 13 passes over the upper end of the lower protruding cam 65, as shown in FIG. 6C, since the wheels 18a and 19a of the engaged parts 16a and 17a on the rear side of the transporting cart 13 are in a state of moving upward along the arc-shaped guide rail part 67b of the intermediate guide rail 67, in a state where both the front and rear wheels 18a to 19b of the transporting cart 13 are along the outer semicircular guide rail 61 and the arc-shaped guide rail part 67b of the intermediate guide rail 67, the transporting cart 13 is reliably scooped up by the engaging part 49a of the auxiliary rotating bodies 49 and the engaging parts 55 of the first endless chain 27 up to the level of the first horizontal pathway section 1 while keeping a horizontal posture. When the cam-following roller 25a of the transporting cart 13 passes over the upper end of the lower protruding cam 65, the engaging parts 55 of the first endless chain 27 fitted to the engaged parts 16a and 17a (the projection shafts 20a and 21a) on the rear side of the transporting cart 13 rotate upward to an angle close to the forward and horizontal direction and thereby can support the rear side of the transporting cart 13 via the engaged parts 16a and 17a, and moreover, the transporting cart 13 is not pushed out forward by the outer semicircular guide rail 61, with the result that the arc-shaped guide rail part 67b of the intermediate guide rail 67 is not essential.

Figure 7A:
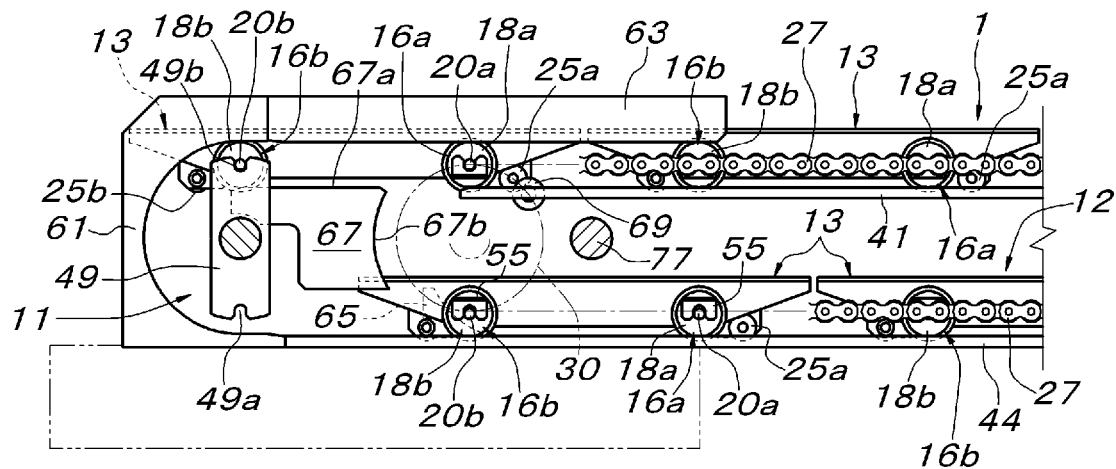
FIG. 7A is a side view of a fourth stage thereof.

As shown in FIG. 7A, the engaging part 49a of the auxiliary rotating body 49 and the engaging parts 55 of the first endless chain 27 individually reach the positions directly above the rotation axial centers, and thus the process of scooping up the transporting cart 13 described above is completed, and at this time, the wheels 18a and 19a on the side of the advancing direction of the transporting cart 13 reach the top of the horizontal guide rail 41 in the first horizontal pathway section 1, and the wheels 18b and 19b on the rear side of the transporting cart 13 reach the top of the auxiliary horizontal guide rail part 67a of the intermediate guide rail 67. Hence, the wheels 18a and 19a on the side of the advancing direction of the transporting cart 13 are sent into the first horizontal pathway section 1 in a state where the projection shafts 20a and 21a remain to be fitted to the engaging parts 55 of the first endless chain 27 which are separated from the turning-part toothed wheel 30 and which move forward parallel to the first horizontal pathway section 1, accordingly, the projection shafts 20b and 21b of the engaged parts 16b and 17b on the rear side of the transporting cart 13 are separated from the engaging part 49a of the auxiliary rotating body 49 and the transporting cart 13 travels horizontally and is sent into the first horizontal pathway section 1 while the wheels 18b and 19b rolling on the auxiliary horizontal guide rail part 67a of the intermediate guide rail 67.

Figure 7B:
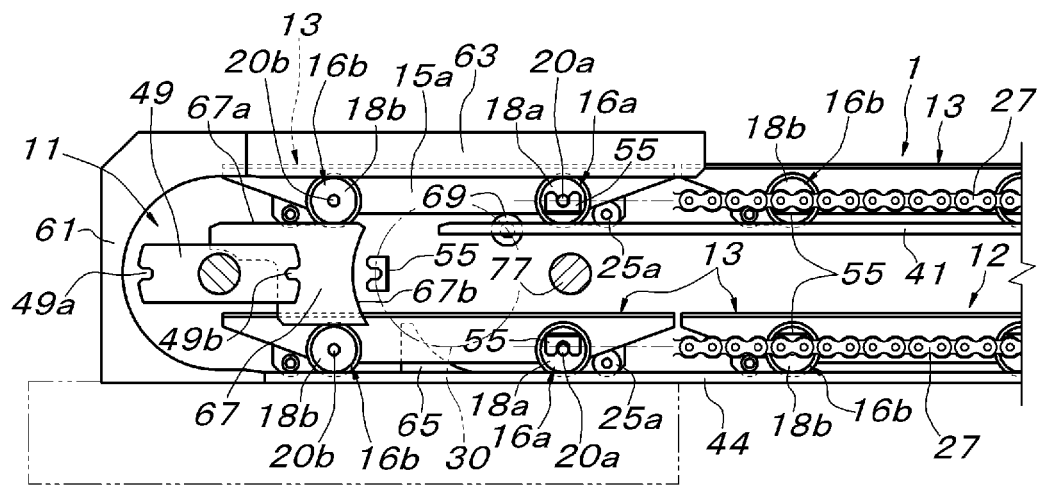
FIG. 7B is a side view of a fifth stage thereof.

Since between the auxiliary horizontal guide rail part 67a of the intermediate guide rail 67 and the horizontal guide rail 41 of the first horizontal pathway section 1, the space is present for the engaging parts 55 of the first endless chain 27 rotating around the turning-part toothed wheel 30 to pass through, when the wheels 18b and 19b on the rear side of the transporting cart 13 are separated forward from the top of the auxiliary horizontal guide rail part 67a of the intermediate guide rail 67, it is considered that the wheels 18b and 19b on the rear side drop between the auxiliary horizontal guide rail part 67a and the horizontal guide rail 41 of the first horizontal pathway section 1. However, when this state is brought about, as shown in FIG. 7B, both the left and right side plates 15a and 15b of the transporting cart 13 are supported by the auxiliary support guide roller 69 behind the wheels 18a and 19a on the side of the advancing direction, and the tops of the wheels 18a and 19a on the side of the advancing direction are covered by the upper horizontal guide rail 63. Hence, while the barycentric position of the transporting cart 13 is located behind the position where the transporting cart 13 is supported by the auxiliary support guide roller 69, the transporting cart 13 is prevented from inclining, with the auxiliary support guide roller 69 being its fulcrum in a direction in which the wheels 18a and 19a on the rear side drop, by the upper horizontal guide rail 63 via the wheels 18a and 19a on the side of the advancing direction. Whereas, in a state where, when the transporting cart 13 further travels and thus the barycentric position of the transporting cart 13 has moved forward beyond the position where the transporting cart 13 is supported by the auxiliary support guide roller 69, the transporting cart 13 can be prevented from inclining, with the wheels 18a and 19a on the side of the advancing direction being its fulcrum in the direction in which the wheels 18a and 19a on the rear side drop, by the auxiliary support guide roller 69.

When the wheels 18b and 19b on the rear side of the transporting cart 13 reach the position directly above the turning-part toothed wheel 30, as shown in FIG. 6A, the empty engaging parts 55 which rotate upward around the turning-part toothed wheel 30, that is, the empty engaging parts 55 which are separated from the engaged parts 16b and 17b on the side of the advancing direction and which rotate upward around the turning-part toothed wheel 30 in the transporting cart 13 subsequent to the transporting cart 13 which is scooped up from the fourth horizontal pathway section 12 to the first horizontal pathway section 1 are fitted to the projection shafts 20b and 21b of the engaged parts 16b and 17b on the rear side of the transporting cart 13 that is sent into the first horizontal pathway section 1 as described above. Hence, in the transporting cart 13 sent into the first horizontal pathway section 1, all the projection shafts 20a to 21b of the engaged parts 16a to 17b are fitted to the respective engaging parts 55 adjacent forward and backward to the first endless chain 27, and the transporting cart 13 is driven to travel toward the next, first turning pathway section 2 in the horizontal posture in a state where all the wheels 18a to 19b are supported on the horizontal guide rail 41.

In the third turning pathway section 6 having a symmetric structure with respect to the sixth turning pathway section 11 described above, as shown in FIGS. 15A to 16B, the same action as when in the sixth turning pathway section 11, the first endless chain 27 is reversely rotated so as to move from the first horizontal pathway section 1 to the fourth horizontal pathway section 12 is performed. That is, in the transporting cart 13 which is made to travel by the first endless chain 27 from the second horizontal pathway section 5 through the third turning pathway section 6 to the third horizontal pathway section 7, the wheels 18a and 19a on the front side can be prevented from dropping between the horizontal guide rail 42 and the auxiliary horizontal guide rail part 68a of the intermediate guide rail 68 by the upper horizontal guide rail 64 and the auxiliary support guide roller 70. Then, immediately before the completion of the turning of the transporting cart 13 downward, that is, when the projection shafts 20b and 21b of the engaged parts 16b and 17b on the rear side are no longer supported by the engaging parts 55 of the first endless chain 27 which incline obliquely downward with respect to the forward direction, the cam-following roller 25b of the auxiliary supported part 24b on the rear side of the bottom part of the transporting cart 13 is supported and guided by the lower protruding cam 66, and thus the transporting cart 13 can be reliably and smoothly turned while keeping the horizontal upright posture until the wheels 18b and 19b on the rear side of the transporting cart 13 reach the top of the horizontal guide rail 43. Since the third turning pathway section 6 has the symmetric structure with respect to the sixth turning pathway section 11, by reversely rotating the first endless chain 27, the transporting cart 13 can be made to travel from the third horizontal pathway section 7 through the third turning pathway section 6 to the second horizontal pathway section 5 while keeping the horizontal upright posture.

Figure 8:
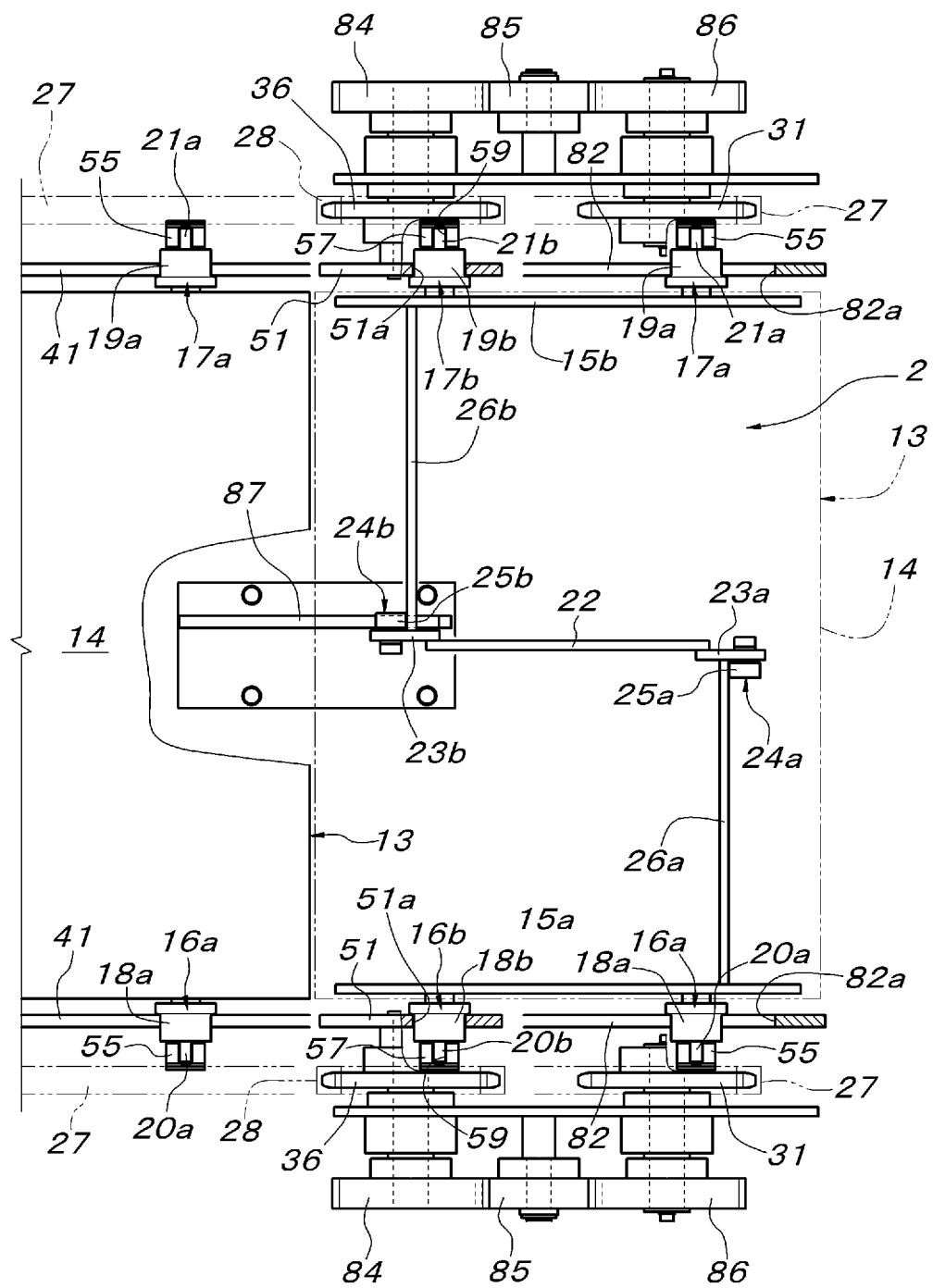
FIG. 8 is a partial cutaway plan view illustrating a second turning pathway section.

The configuration and action of the second turning pathway section 4 will next be described with reference to FIGS. 8 and 9. Since the lower end guide toothed wheel 36 at the lower end of the second endless chain 28 of the first lifting/lowering pathway section 3 on the second turning pathway section 4 is positioned directly above the first endless chain 27 which moves along the first horizontal pathway section 1, the lower end guide toothed wheel 36 needs to be pivotally supported separately upward from the first endless chain 27 which moves along the first horizontal pathway section 1 in order to prevent the engaging parts 57 of the second endless chain 28 rotating around the lower end guide toothed wheel 36 and the engaging parts 55 of the first endless chain 27 moving along the first horizontal pathway section 1 from interfering with each other. On the other hand, although the first endless chain 27 is lifted through the turning-part toothed wheel 31 to the first lifting/lowering pathway section 3, since the turning-part toothed wheel 31 needs to be pivotally supported at the same level as the lower end guide toothed wheel 36 of the second endless chain 28, the first endless chain 27 which passes through below the lower end guide toothed wheel 36 is inclined upward toward the turning-part toothed wheel 31. In order to move the engaged parts 16a and 17a in the advancing direction of the transporting cart 13 along the upward gradient of the first endless chain 27, a pair of left and right lower inclined guide rails 82 for supporting and guiding the wheels 18a and 19a of the engaged parts 16a and 17a are laid.

The upper end part of the lower inclined guide rail 82 includes an arc-shaped rail part 82a which is formed in the shape of an arc concentrically with the turning-part toothed wheel 31, and the lower end of the vertical guide rail 45a on the outer side of the vertical guide rails 45a and 45b which sandwich the moving pathway of the first endless chain 27 in the first lifting/lowering pathway section 3 is connected to the arc-shaped rail part 82a. On the other hand, the lower end part of the vertical guide rail 46a on the side of the first endless chain 27 of the vertical guide rails 46a and 46b which sandwich the moving pathway of the second endless chain 28 and the lower end part of the vertical guide rail 45b on the inner side of the vertical guide rails 45a and 45b are integrated with a coupling plate member 83; in the coupling plate member 83, an arc-shaped rail part 83a which sandwiches the wheels 18a and 19a of the engaged parts 16a and 17a rotating around the turning-part toothed wheel 31 with the arc-shaped rail part 82a of the lower inclined guide rail 82 and which guides the wheels 18a and 19a and an arc-shaped rail part 83b which guides the wheels 18b and 19b of the engaged parts 16b and 17b on the rear side of the transporting cart 13 that move up around the lower end guide toothed wheel 36 of the second endless chain 28 are formed.

On the inner side of the lower end guide toothed wheel 36 of the second endless chain 28, the circular-plate-shaped auxiliary rotating body 51 whose radius is substantially equal to the rotation radius of the engaging part 57 of the second endless chain 28 rotating around the lower end guide toothed wheel 36 is continuously provided so as to rotate integrally; on both sides in the diameter direction around the auxiliary rotating body 51, engaging parts 51a and 51b which are formed with concave parts that are fitted to the wheels 18b and 19b on the rear side of the transporting cart 13 are provided so as to overlap the engaging part 57 of the second endless chain 28. The turning-part toothed wheel 31 of the first endless chain 27 and the auxiliary rotating body 51 are aligned in parallel at intervals equal to the support interval for the transporting cart 13 apart horizontally, and the turning-part toothed wheel 31, the lower end guide toothed wheel 36 of the second endless chain 28 and the auxiliary rotating body 51 which are driven to rotate by the engagement with the first endless chain 27 are coupled by spur gear trains 84, 85 and 86 in an interlocking manner so as to rotate at the same speed in the same direction. Furthermore, in an intermediate lower position of the pair of left and right lower end guide toothed wheels 36 (the auxiliary rotating bodies 51) in the second endless chain 28, a lower protruding cam 87 which acts on the cam-following roller 25b of the auxiliary supported part 24b on the rear side of the transporting cart 13 is provided so as to protrude. The lower protruding cam 87 has the same height as the lower protruding cams 65 and 66 which are arranged in the sixth turning pathway section 11 (the third turning pathway section 6), and has the same shape as a portion which is obtained by cutting the arc-shaped rail part 82a at the upper end of the lower inclined guide rail 82 at the same height as the upper end of the lower protruding cam 87.

In the second turning pathway section 4 configured as described above, when the transporting cart 13 traveling horizontally on the first horizontal pathway section 1 with the first endless chain 27 reaches the second turning pathway section 4, the wheels 18*a* and 19*a* of the engaged parts 16*a* and 17*a* on the front side which engage with the engaging parts 55 of the first endless chain 27 are guided by the lower inclined guide rail 82 and are thereby moved obliquely forward, and when the wheels 18*a* and 19*a* enter the top of the lower inclined guide rail 82, the lower protruding cam 87 is arranged such that the cam-following roller 25*b* of the auxiliary supported part 24*b* on the rear side of the bottom part of the transporting cart 13 enters the top of the lower protruding cam 87. Hence, the transporting cart 13 is guided by the lower inclined guide rail 82 and the lower protruding cam 87 so as to travel obliquely upward with respect to the forward direction while keeping the horizontal posture.

Figure 9A:
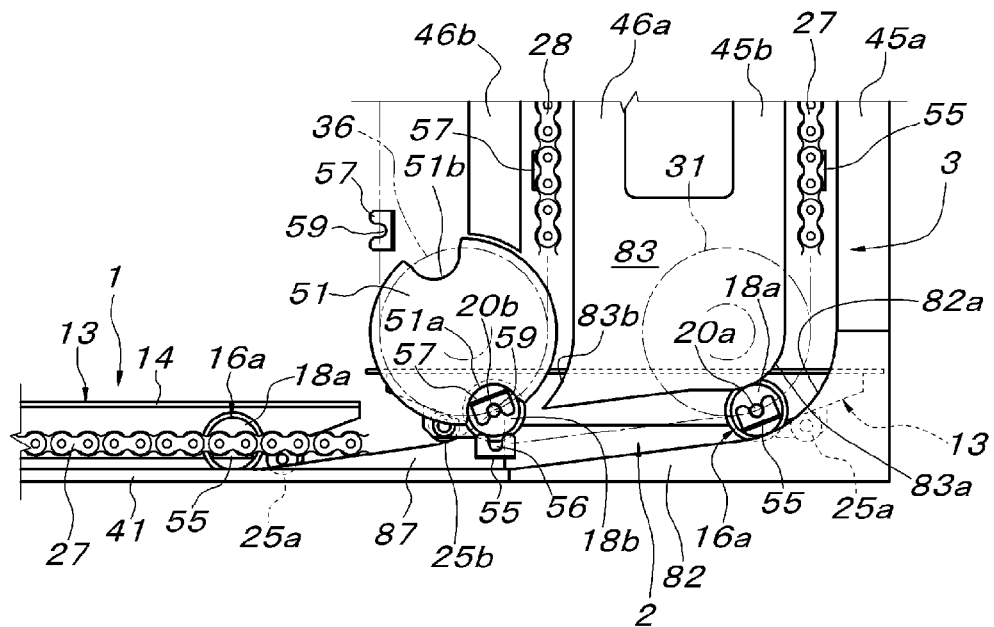
FIG. 9A is a side view of a first stage illustrating the travel of the transporting cart from the first horizontal pathway section through a second turning pathway section to a first lifting/lowering pathway section.
Figure 9B:
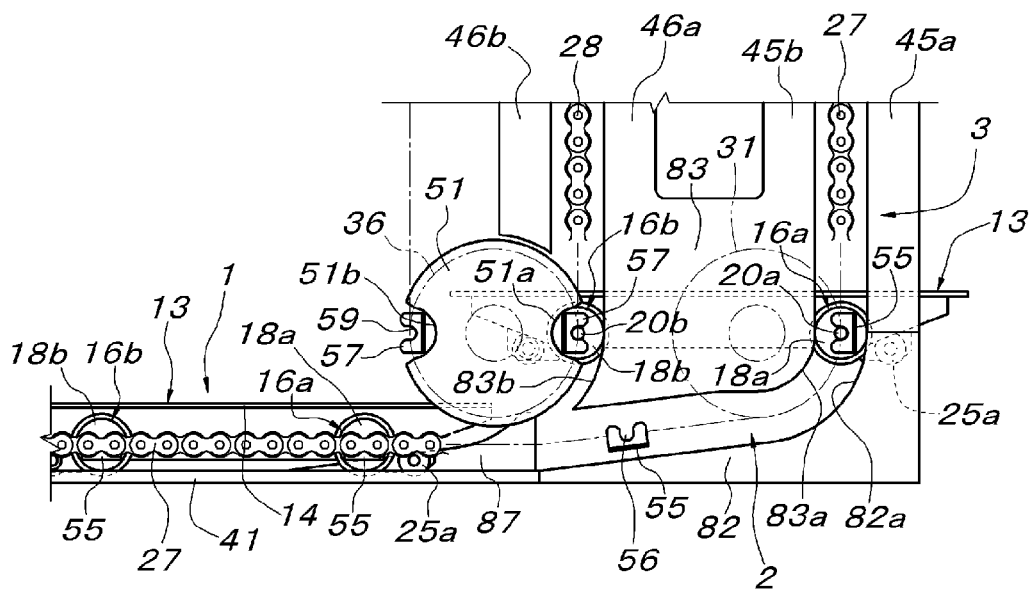
FIG. 9B is a side view of a second stage thereof.

When the front and rear engaged parts 16*a* to 17*b* of the transporting cart 13 reach the respective positions directly below the turning-part toothed wheel 31 of the first endless chain 27 and the lower end guide toothed wheel 36 (the auxiliary rotating body 51) of the second endless chain 28, the one engaging part 51*a* of the pair of left and right auxiliary rotating bodies 51 interlocking with the first endless chain 27 is fitted from above to the wheels 18*b* and 19*b* of the engaged parts 16*b* and 17*b* on the rear side of the transporting cart 13, and as shown in FIG. 9A, in synchronization with the scooping-up of the wheels 18*a* and 19*a* of the engaged parts 16*a* and 17*a* on the front side along the arc-shaped rail part 82*a* of the lower inclined guide rails 82, the wheels 18*b* and 19*b* of the rear-side engaged parts 16*b* and 17*b* are scooped up by the engaging part 51*a* of the auxiliary rotating body 51. At this time, the wheels 18*b* and 19*b* scooped up by the engaging part 51*a* of the auxiliary rotating body 51 enter the inner side of the arc-shaped rail part 83*b* of the coupling plate member 83, and thus the wheels 18*b* and 19*b* are prevented from being disengaged from the engaging part 51*a* of the auxiliary rotating body 51.

As described above, as shown in FIG. 9B, after the front and rear engaged parts 16*a* to 17*b* of the transporting cart 13 are scooped up to the respective heights directly beside the turning-part toothed wheel 31 of the first endless chain 27 and the lower end guide toothed wheel 36 (the auxiliary rotating body 51) of the second endless chain 28, the projection shafts 20*a* and 21*a* of the engaged parts 16*a* and 17*a* on the front side of the transporting cart 13 are lifted by the engaging part 55 of the first endless chain 27, the wheels 18*a* and 19*a* on the front side move up between the pair of front and rear vertical guide rails 45*a* and 45*b*, the projection shafts 20*b* and 21*b* of the engaged parts 16*b* and 17*b* on the rear side of the transporting cart 13 are lifted by the engaging part 57 of the second endless chain 28 and the wheels 18*b* and 19*b* on the rear side move up between the pair of front and rear vertical guide rails 46*a* and 46*b*, with the result that the transporting cart 13 moves up along the first lifting/lowering pathway section 3 while keeping the horizontal upright posture.

Figure 10:
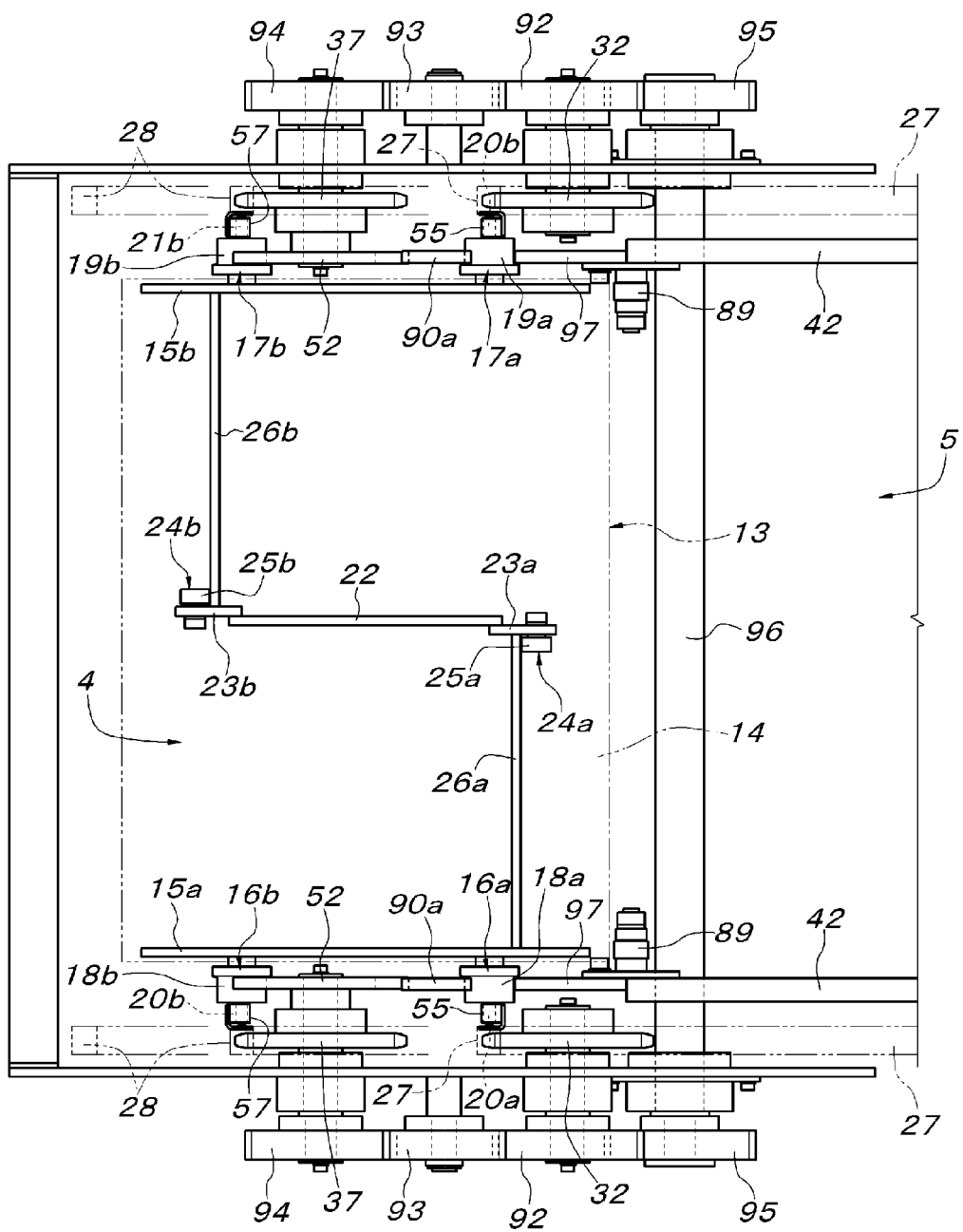
FIG. 10 is a partial cutaway plan view illustrating a third turning pathway section.
Figure 11:
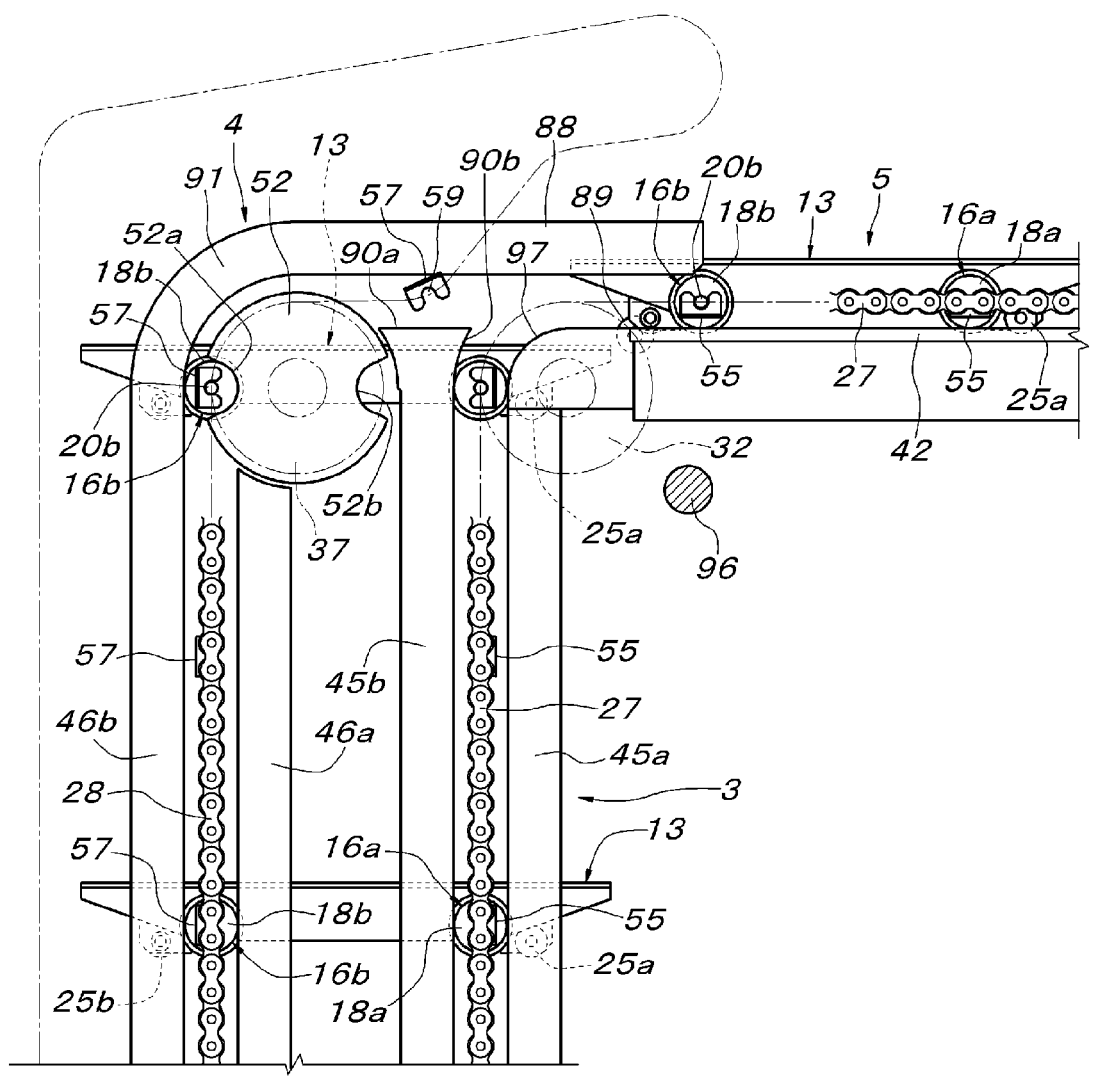
FIG. 11 is a side view of a first stage illustrating the travel of the transporting cart from the first lifting/lowering pathway section through a third turning pathway section to a second horizontal pathway section.

The transporting cart 13 which moves up along the first lifting/lowering pathway section 3 travels from the first lifting/lowering pathway section 3 through the second turning pathway section 4 to the high-position second horizontal pathway section 5, and the configuration and action of the second turning pathway section 4 will next be described. As shown in FIGS. 10 to 12, on the inner side of the pair of left and right upper end guide toothed wheels 37 of the second endless chain 28 which are pivotally supported and which are separated by only the interval equal to the support interval for the transporting cart 13 apart backward from the turning-part toothed wheel 32 of the first endless chain 27, the auxiliary rotating body 52 having the same structure as the auxiliary rotating body 51 provided integrally with the lower end guide toothed wheel 36 of the first turning pathway section 2 is continuously provided so as to rotate integrally in a state where engaging parts 52*a* and 52*b* thereof overlap the engaging part 57 of the second endless chain 28.

An upper horizontal guide rail 88 which corresponds to the upper horizontal guide rail 63 provided in the sixth turning pathway section 11, an auxiliary support guide roller 89 which corresponds to the auxiliary support guide roller 69 provided in the sixth turning pathway section 11, an auxiliary horizontal guide rail part 90*a* which corresponds to the auxiliary horizontal guide rail part 67*a* of the intermediate guide rail 67 provided in the sixth turning pathway section 11 and an arc-shaped guide rail part 90*b* which corresponds to the upper half portion of the arc-shaped guide rail part 67*b* of the intermediate guide rail 67 provided in the sixth turning pathway section 11 are respectively provided; an outer arc-shaped guide rail 91 is also provided which connects the upper end of the vertical guide rail 46*b* on the outer side of the second endless chain 28 and the upper horizontal guide rail 88 and which is concentric with the upper end guide toothed wheel 37 of the second endless chain 28. The auxiliary horizontal guide rail part 90*a* and the arc-shaped guide rail part 90*b* are formed at the upper end of the vertical guide rail 45*b* on the outer side of the first endless chain 27. The upper end of the vertical guide rail 45*a* on the inner side of the first endless chain 27 is connected to the horizontal guide rail 42 of the second horizontal pathway section 5 via an inner arc-shaped guide rail 97 which is concentric with the turning-part toothed wheel 32.

As in the configuration of the sixth turning pathway section 11, as shown in FIG. 10, the pair of left and right upper end guide toothed wheels 37 which guide the second endless chain 28 of the second turning pathway section 4 and the pair of left and right turning-part toothed wheels 32 which engage with the first endless chain 27 are coupled in an interlocking manner with spur gear trains 92 to 94 for each of the left and right, and are coupled to each other in an interlocking manner with one transmission shaft 96 which has spur gears 95 at both ends. The transmission shaft 96 crosses on the lower side of the second horizontal pathway section 5. The second endless chain 28 which is extended through the upper end guide toothed wheel 37 returns through the guide toothed wheel 40*b* and the take-up toothed wheel 40*a* toward the lower end guide toothed wheel 36 at the lower end of the first lifting/lowering pathway section 3, and the position in which the engaging part 57 of the second endless chain 28 is separated upward from the projection shafts 20*b* and 21*b* of the engaged parts 16*b* and 17*b* on the rear side of the transporting cart 13 is the position in which the projection shafts 20*b* and 21*b* of the engaged parts 16*b* and 17*b* reach the top of the auxiliary horizontal guide rail part 90*a*.

Figure 12A:
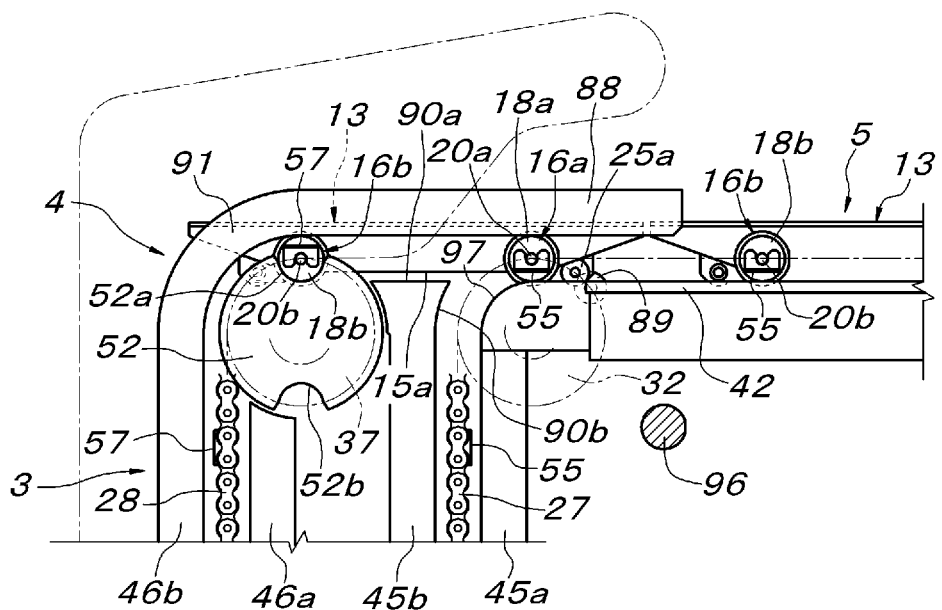
FIG. 12A is a side view of a second stage thereof.
Figure 12B:
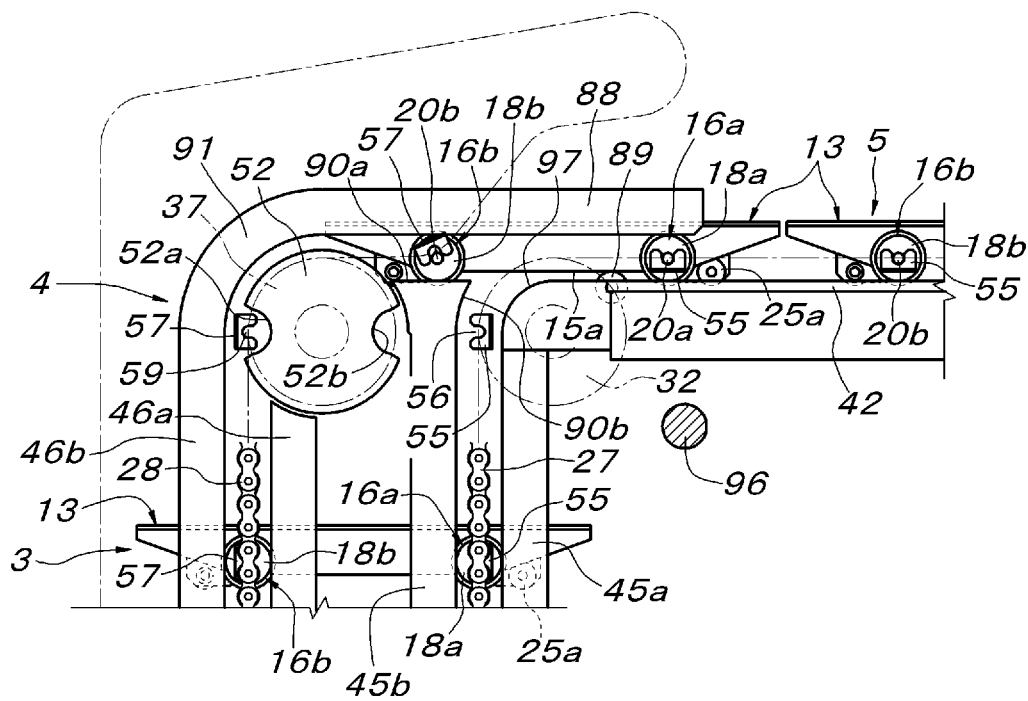
FIG. 12B is a side view of a third stage thereof.

In the configuration of the second turning pathway section 4 configured as described above, when the transporting cart 13 which moves up along the first lifting/lowering pathway section 3 reaches the height of the axial centers of the auxiliary rotating body 52 of the second turning pathway section 4 and the turning-part toothed wheel 32 of the first endless chain 27, as shown in FIG. 11, the wheels 18*b* and 19*b* of the engaged parts 16*b* and 17*b* on the rear side of the transporting cart 13 are fitted to the engaging part 52a of the auxiliary rotating body 52. Thereafter, by the rotation of the auxiliary rotating body 52 and the turning-part toothed wheel 32, as shown in FIGS. 12A and 12B, the wheels 18a and 19a of the engaged parts 16a and 17a on the front side fitted to the engaging part 55 of the first endless chain 27 are sent into the top of the second horizontal pathway section 5 through the top of the inner arc-shaped guide rail 97, and the wheels 18b and 19b of the engaged parts 16b and 17b on the rear side are separated from the engaging part 52a of the auxiliary rotating body 52 and are transferred to the top of the auxiliary horizontal guide rail part 90a. At this time, the engaging part 57 of the second endless chain 28 fitted to the projection shafts 20b and 21b of the engaged parts 16b and 17b on the rear side is separated in a position on the upper side of the auxiliary horizontal guide rail part 90a obliquely upward from the projection shafts 20b and 21b. Thereafter, by the engaging part 55 of the first endless chain 27, the transporting cart 13 is sent into the second horizontal pathway section 5 via the projection shafts 20a and 21a of the engaged parts 16a and 17a on the front side. In this process, the engaging part 55 of the first endless chain 27 rotating around the turning-part toothed wheel 32 is fitted to the projection shafts 20b and 21b of the engaged parts 16b and 17b on the rear side of the transporting cart 13. In this way, the transporting cart 13 is sent from the first lifting/lowering pathway section 3 through the second turning pathway section 4 into the second horizontal pathway section 5 while keeping the horizontal upright posture.

Within the second horizontal pathway section 5, the transporting cart 13 is driven to travel horizontally on the horizontal guide rail 42 by the engaging parts 55 of the first endless chain 27 fitted to the projection shafts 20a to 21b of the front and rear engaged parts 16a to 17b in the transporting cart 13. Then, the transporting cart 13 which has reached the third turning pathway section 6 makes a U-turn by the action previously described on the third turning pathway section 6 while keeping the horizontal upright posture into the third horizontal pathway section 7, and is driven to travel the third horizontal pathway section 7 to the side of the fourth turning pathway section 8 by the first endless chain 27. Then, the transporting cart 13 is sent into the second lifting/lowering pathway section 9 through the fourth turning pathway section 8, and the configuration and action of the fourth turning pathway section 8 will next be described.

Figure 17:
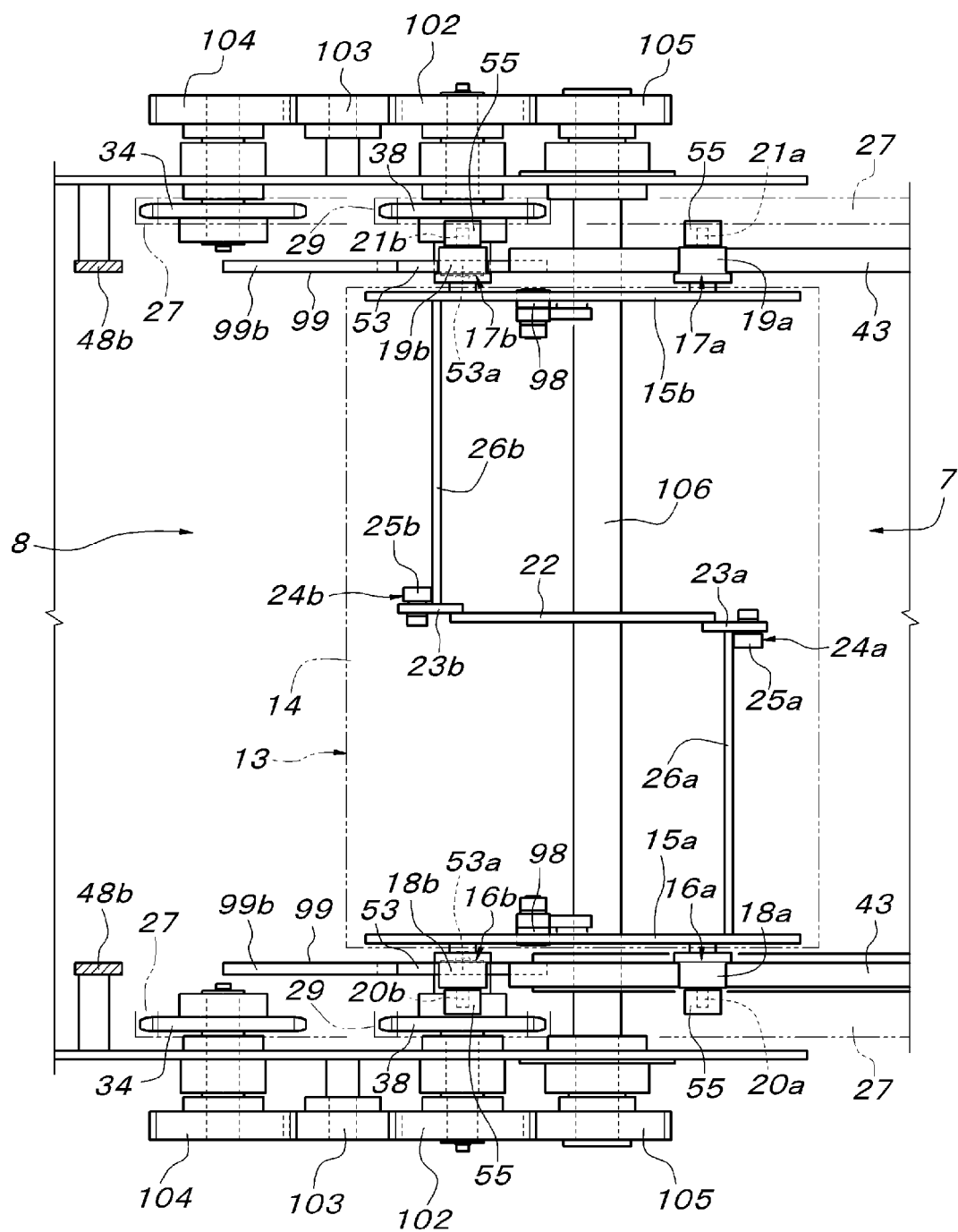
FIG. 17 is a partial cutaway plan view illustrating a fifth turning pathway section.
Figure 18A:
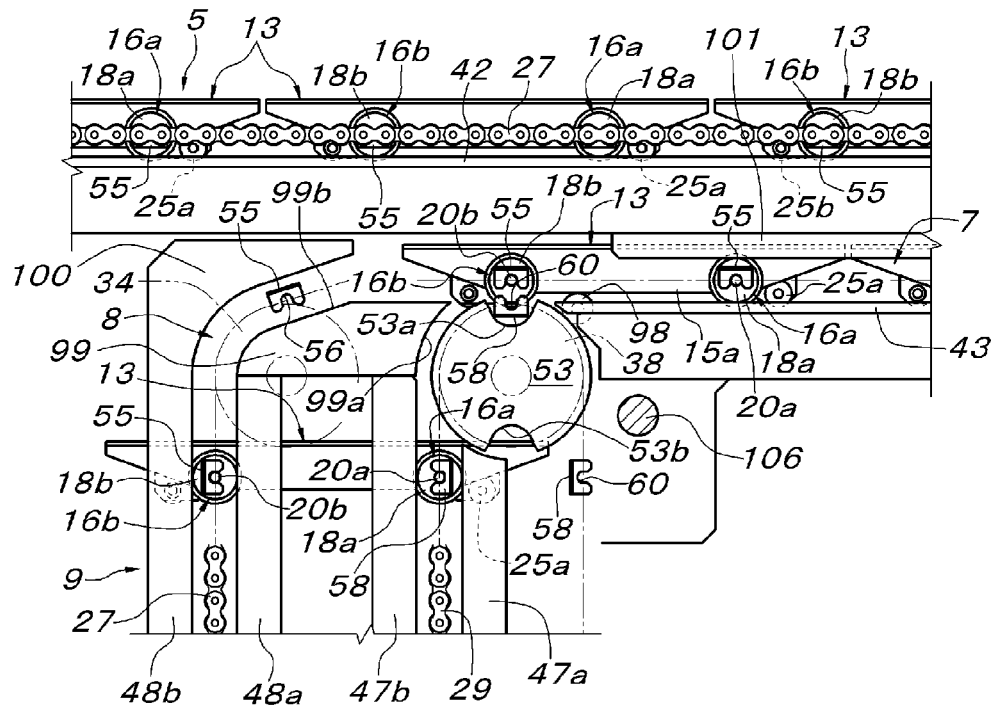
FIG. 18A is a side view of a first stage illustrating the travel of the transporting cart from the third horizontal pathway section through the fifth turning pathway section to a second lifting/lowering pathway section.
Figure 18B:
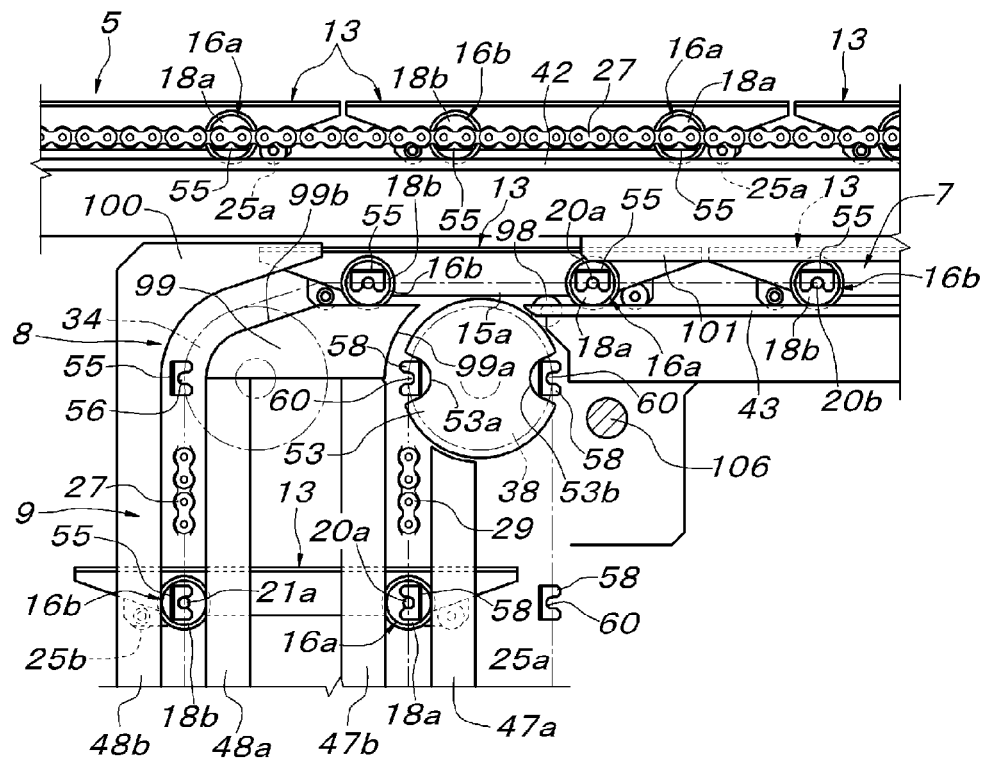
FIG. 18B is a side view of a second stage thereof.
Figure 19A:
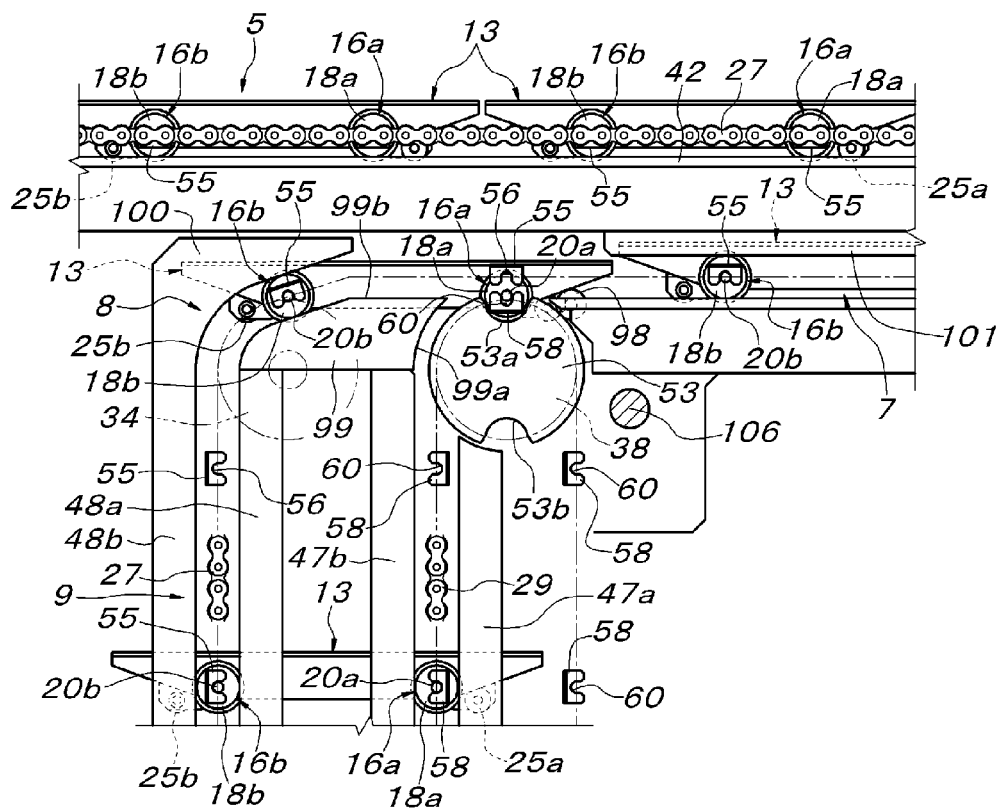
FIG. 19A is a side view of a third stage thereof.
Figure 19B:
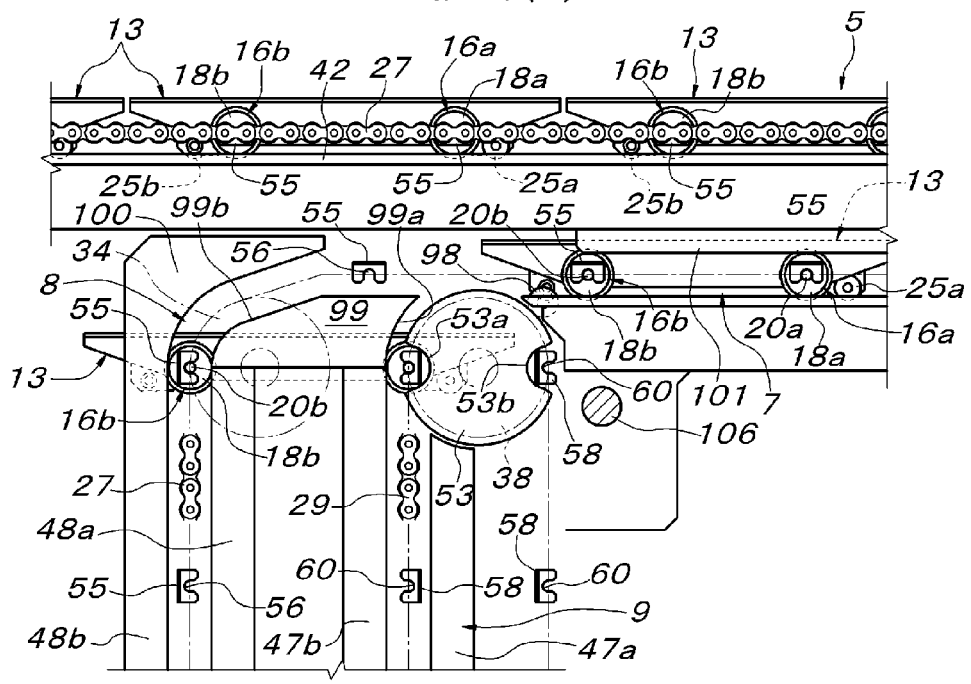
FIG. 19B is a side view of a fourth stage thereof.
Figure 20:
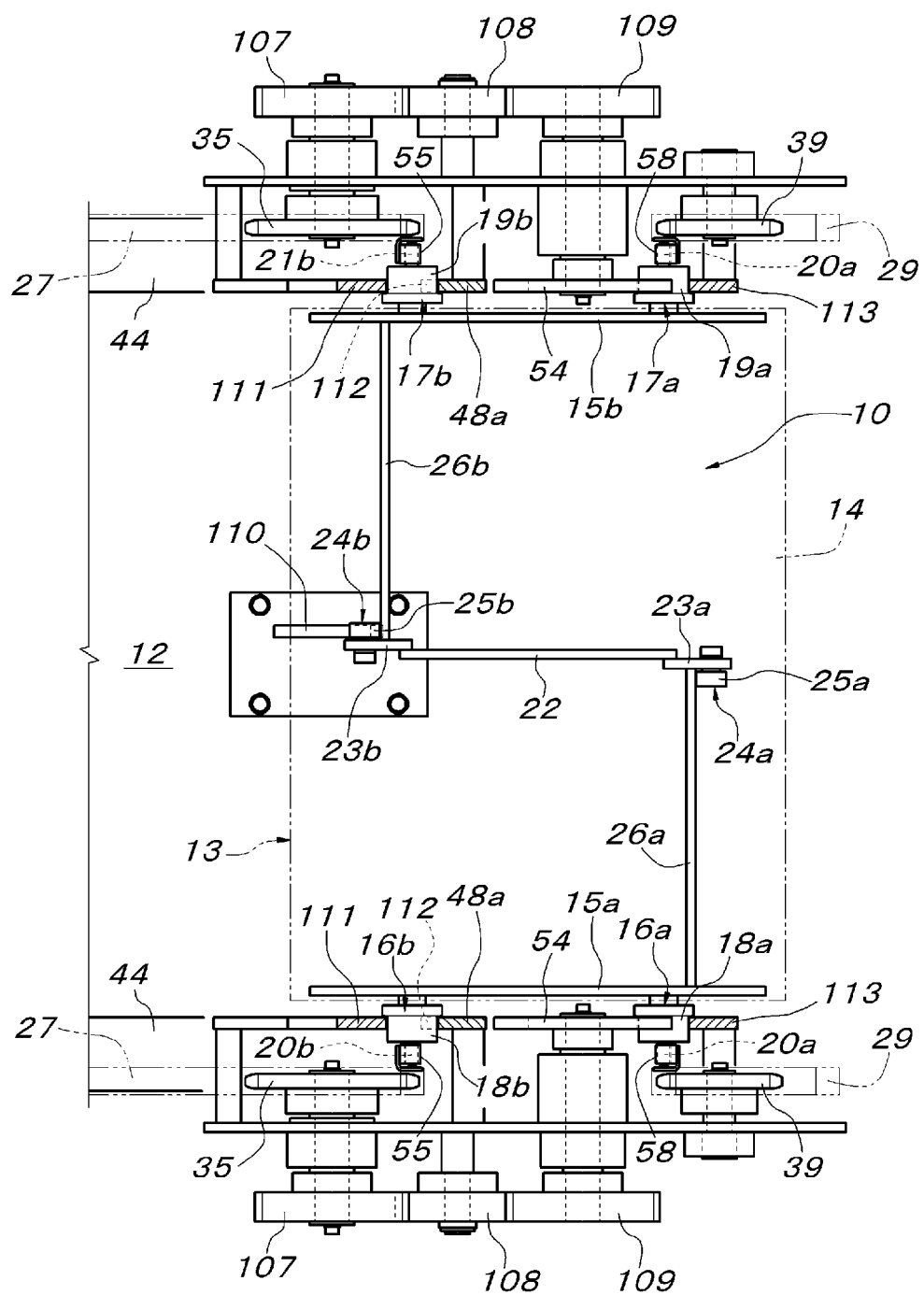
FIG. 20 is a partial cutaway plan view illustrating a sixth turning pathway section.
Figure 21:
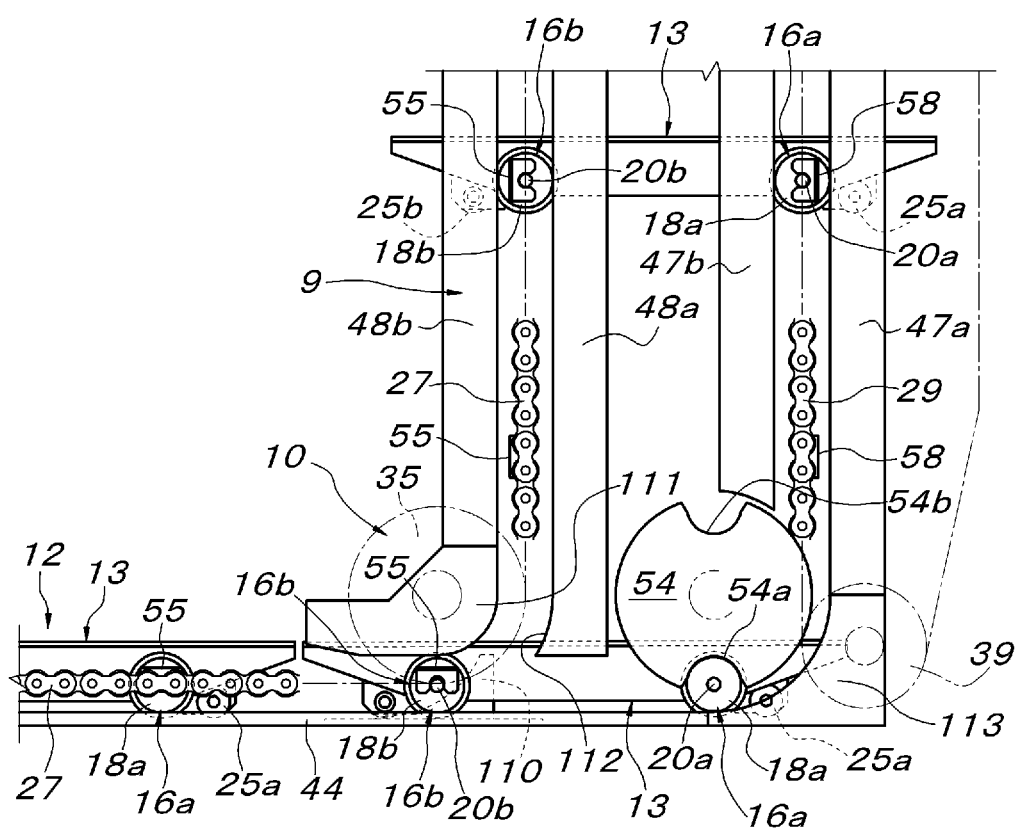
FIG. 21 is a side view of a first stage illustrating the travel of the transporting cart from the second lifting/lowering pathway section through the sixth turning pathway section to the fourth horizontal pathway section.

As shown in FIGS. 17 to 19, in the fourth turning pathway section 8, the upper end guide toothed wheel 38 at the upper end of the second endless chain 29 in the second lifting/lowering pathway section 9 is lowered to such a height so as not to interfere with the engaged parts 16b and 17b on the front side of the transporting cart 13 traveling in the third horizontal pathway section 7. Then, since the turning-part toothed wheel 34 of the first endless chain 27 is pivotally supported at the same level as the upper end guide toothed wheel 38, a downward gradient part of the first endless chain 27 is formed in the upstream of the turning-part toothed wheel 34. An auxiliary support guide roller 98 which corresponds to the auxiliary support guide rollers 69, 70 and 89 that are provided in the sixth turning pathway section 11, the second turning pathway section 4 and the third turning pathway section 6 described previously is pivotally supported to the end part of the horizontal guide rail 43 of the third horizontal pathway section 7. In the third horizontal pathway section 7, at least over the region of the end part on the side of the fourth turning pathway section 8, an upper horizontal guide rail 101 is laid which covers the top of the wheels 18a to 19b of the transporting cart 13 that enters the fourth turning pathway section 8 from the third horizontal pathway section 7.

On the inner side of the pair of left and right upper end guide toothed wheels 38 at the upper end of the second endless chain 29, the auxiliary rotating body 53 that is the same as the auxiliary rotating body 52 of the second turning pathway section 4 and that includes engaging parts 53a and 53b formed with concave parts in which the wheels 18a to 19b are fitted to both sides in the diameter direction is continuously provided concentrically and integrally. The upper end of the vertical guide rail 47b of the pair of front and rear vertical guide rails 47a and 47b provided on the side of the first endless chain 27 in the second lifting/lowering pathway section 9 and the upper end of the vertical guide rail 48a of the pair of front and rear vertical guide rails 48a and 48b provided on the side of the second endless chain 29 are integrally coupled with an inner auxiliary guide rail 99; in the inner auxiliary guide rail 99, an arc-shaped guide rail part 99a which is connected to the upper end of the vertical guide rail 47b and which is concentric with the upper end guide toothed wheel 38 and a lower guide rail part 99b which guides the wheels 18b and 19b on the front side of the transporting cart 13 between vertical guide rails 48a and 48b on the side of the first endless chain 27 are formed; and at the upper end of the vertical guide rail 48b, an outer auxiliary guide rail 100 is continuously provided which guides, with the lower guide rail part 99b, the front-side wheels 18b and 19b of the transporting cart 13 between the vertical guide rails 48a and 48b. A wheel passage formed between the lower guide rail part 99b and the outer auxiliary guide rail 100 guides the front-side wheels 18b and 19b of the transporting cart 13 which has traveled forward in the third horizontal pathway section 7, via a downward gradient inclined passage and an arc-shaped passage concentric with the turning-part toothed wheel 34 of the first endless chain 27, between the vertical guide rails 48a and 48b on the side of the first endless chain 27.

One transmission shaft 106 which has, at both ends, a spur gear 105 meshing with the spur gear 102 of respective spur gear trains 102 to 104 is provided so that the turning-part toothed wheel 34 and the upper end guide toothed wheel 38 present on both left and right sides are respectively coupled with the spur gear trains 102 to 104 so that they interlock at the same speed in the same direction and that the turning-part toothed wheel 34 and the upper end guide toothed wheel 38 on both left and right sides are interlocked with each other. The transmission shaft 106 is supported so as to cross a recessed corner part between the second lifting/lowering pathway section 9 and the third horizontal pathway section 7.

Each transporting cart 13 which is supported by the horizontal guide rail 43 of the third horizontal pathway section 7 via the wheels 18a to 19b is driven to travel via the engaging parts 55 fitted from above to below to the projection shafts 20a to 21b of the respective engaged parts 16a to 17b toward the fourth turning pathway section 8 with the first endless chain 27. When the wheels 18b and 19b on the front side of the transporting cart 13 are separated from the top of the horizontal guide rail 43, the lower sides of both the left and right side plates 15a and 15b of the transporting cart 13 are, as shown in FIG. 18A, supported by the pair of left and right auxiliary support guide rollers 98, and since the upper horizontal guide rail 101 covers the top of the wheels 18a and 19a on the rear side, the wheels 18b and 19b on the front side of the transporting cart 13 can, as shown in FIG. 18B, transfer to the top of the lower guide rail part 99b of the inner auxiliary guide rail 99 without dropping between the horizontal guide rail 43 of the third horizontal pathway section 7 and the lower guide rail part 99*b* of the inner auxiliary guide rail 99. Then, when the rear-side wheels 18*a* and 19*a* of the transporting cart 13 are separated from the horizontal guide rail 43, since the auxiliary rotating body 53 rotates such that the one engaging part 53*a* of the auxiliary rotating body 53 interlocking with the first endless chain 27 is, as shown in FIG. 19A, positioned directly below the rear-side wheels 18*a* and 19*a*, the rear-side wheels 18*a* and 19*a* are fitted to the engaging part 53*a* of the auxiliary rotating body 53 so as to be separated from the horizontal guide rail 43 and to simultaneously drop slightly.

When the rear-side wheels 18*a* and 19*a* are fitted to the engaging part 53*a* of the auxiliary rotating body 53 so as to drop thereto, the wheels 18*b* and 19*b* on the front side move in the downward gradient part between the outer auxiliary guide rail 100 and the lower guide rail part 99*b* of the inner auxiliary guide rail 99, and thus the transporting cart 13 can maintain a substantially horizontal posture. Thereafter, the engaging part 55 of the first endless chain 27 fitted from above to the front-side wheels 18*b* and 19*b* of the transporting cart 13 and the engaging part 58 of the second endless chain 29 fitted from below to the rear-side wheels 18*a* and 19*a* of the transporting cart 13 lower in the shape of an arc by the synchronous rotation of the turning-part toothed wheel 34 and the auxiliary rotating body 53 while keeping the same level, and then vertically lower and move in the second lifting/lowering pathway section 9, with the result that the transporting cart 13 lowers in the shape of an arc in the fourth turning pathway section 8 while keeping the horizontal upright posture and then vertically lowers and moves in the second lifting/lowering pathway section 9.

As when the transporting cart 13 moves up in the first lifting/lowering pathway section 3, the transporting cart 13 which lowers in the second lifting/lowering pathway section 9 lowers and moves toward the fifth turning pathway section 10 so as to sandwich the wheels 18*a* to 19*b* from both sides forward and backward in a horizontal posture supported by the engaging part 55 of the first endless chain 27 and the engaging part 58 of the second endless chain 29 fitted to the respective wheels 18*a* to 19*b* in the horizontal direction. Thereafter, the transporting cart 13 is sent into the original fourth horizontal pathway section 12 through the fifth turning pathway section 10, and the configuration and action of the fifth turning pathway section 10 will next be described with reference to FIGS. 20 to 22.

In the fifth turning pathway section 10, the auxiliary rotating body 54 that is the same as the auxiliary rotating body 53 provided in the fourth turning pathway section 8 and that includes engaging parts 54*a* and 54*b* formed with concave parts which are fitted to the wheels 18*a* and 19*a* on the rear side of the transporting cart 13 on both sides in the diameter direction is pivotally supported in a position by only the support interval for the transporting cart 13 apart outward (to the opposite side to the side where the fourth horizontal pathway section 12 is present) and horizontally from the turning-part toothed wheel 35 which turns the first endless chain 27 toward the fourth horizontal pathway section 12. By exactly the same action as the turning-part toothed wheel 30 and the auxiliary rotating body 49, the turning-part toothed wheel 32 and the auxiliary rotating body 52, the turning-part toothed wheel 33 and the auxiliary rotating body 50 and the turning-part toothed wheel 34 and the auxiliary rotating body 53 of the respective turning pathway sections, the auxiliary rotating body 54 and the turning-part toothed wheel 35 turn the transporting cart 13 which has lowered in the second lifting/lowering pathway section 9 in the shape of an arc while keeping the horizontal upright posture and send the transporting cart 13 into the fourth horizontal pathway section 12; spur gear trains 107 to 109 for coupling, in an interlocking manner, for each of the left and right, the pair of left and right turning-part toothed wheels 35 and the pair of left and right auxiliary rotating bodies 54 which are driven to rotate by the first endless chain 27 are provided. The second endless chain 29 of the second lifting/lowering pathway section 9 is hung and stretched by the lower end guide toothed wheel 39 such that the engaging part 58 thereof vertically lowers and that thus the rear-side wheels 18*a* and 19*a* of the transporting cart 13 to which the engaging part 58 is fitted can be taken over by the engaging parts 54*a* and 54*b* of the auxiliary rotating body 54 which rotates synchronously.

On the lower side in the center part between the pair of left and right turning-part toothed wheels 35, a lower protruding cam 110 which performs the same action as the lower protruding cam 66 provided in the third turning pathway section 6 is provided so as to protrude. At the lower end of the outer vertical guide rail 48*b* of the pair of front and rear vertical guide rails 48*a* and 48*b* on the side of the first endless chain 27 in the second lifting/lowering pathway section 9, an inner corner part guide rail 111 for guiding the front-side wheels 18*b* and 19*b* of the transporting cart 13 through around the turning-part toothed wheel 35 to the top of the horizontal guide rail 44 of the fourth horizontal pathway section 12 is continuously provided. The horizontal guide rail 44 of the fourth horizontal pathway section 12 is provided so as to extend to the region of the lower side of the auxiliary rotating body 54; the lower end of the inner vertical guide rail 48*a* which pairs with the vertical guide rail 48*b* is lowered to such a height so as not to affect the horizontal movement of the rear-side wheels 18*a* and 19*a* of the transporting cart 13 on the horizontal guide rail 44; and on the side of the turning-part toothed wheel 35, an arc-shaped rail part 112 for guiding the front-side wheels 18*b* and 19*b* sent out onto the horizontal guide rail 44 through around the turning-part toothed wheel 35 with the inner corner part guide rail 111 toward the fourth horizontal pathway section 12 is formed. Furthermore, at the lower end of the outer vertical guide rail 47*a* of the pair of front and rear vertical guide rails 47*a* and 47*b* on the side of the second endless chain 29 in the second lifting/lowering pathway section 9, an outer arc-shaped guide rail 113 is continuously provided which guides the rear-side wheels 18*a* and 19*a* fitted to the engaging parts 54*a* and 54*b* of the auxiliary rotating body 54 and sent out onto the horizontal guide rail 44 and which is concentric with the auxiliary rotating body 54.

Figure 22A:
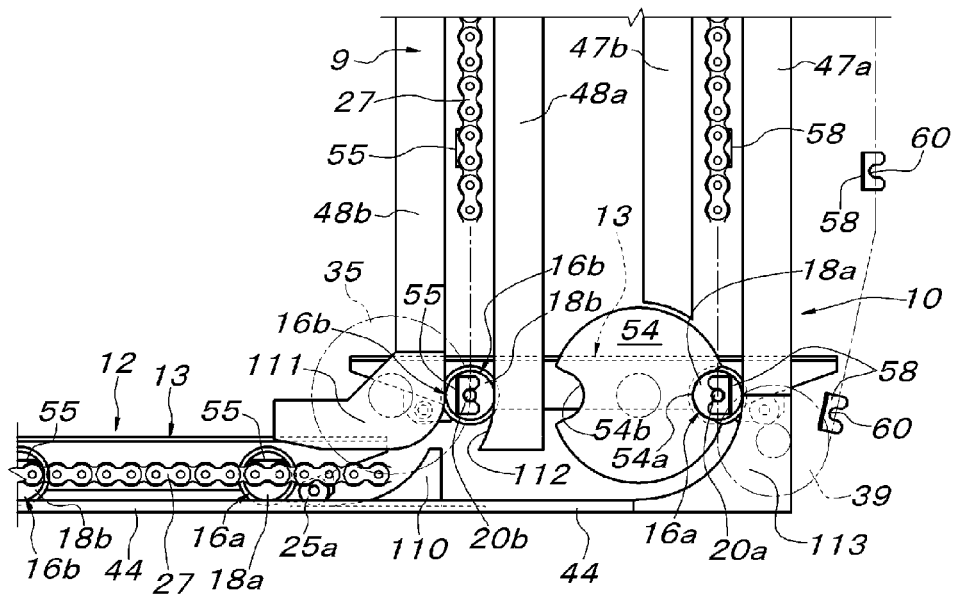
FIG. 22A is a side view of a second stage thereof.
Figure 22B:
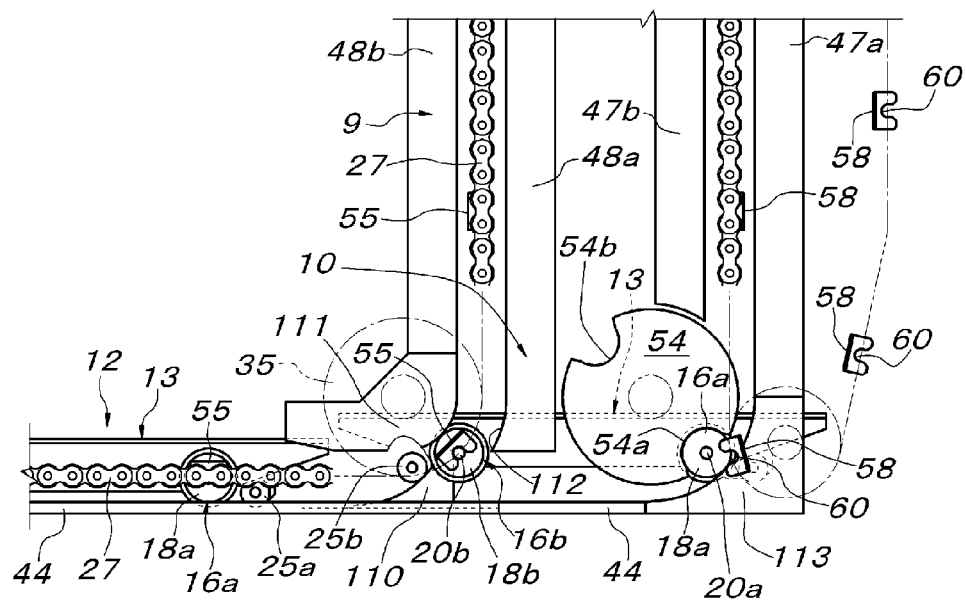
FIG. 22B is a side view of a third stage thereof.

In the configuration of the fifth turning pathway section 10 described above, as shown in FIG. 21, the one engaging part 54*a* of the auxiliary rotating body 54 which rotates synchronously in an interlocking manner with the second endless chain 29 and the first endless chain 27 is, as shown in FIG. 22A, fitted to the rear-side wheels 18*a* and 19*a* of the transporting cart 13 which lowers in the second lifting/lowering pathway section 9 immediately before the engaging part 58 of the second endless chain 29 rotates around the lower end guide toothed wheel 39, and thus the wheels 18*a* and 19*a* transfer onto the horizontal guide rail 44 of the fourth horizontal pathway section 12 while being prevented from being removed from the engaging part 54*a* with the outer arc-shaped guide rail 113. On the other hand, although the front-side wheels 18*b* and 19*b* which fit to the engaging part 55 of the first endless chain 27 and which lowers between the vertical guide rails 48a and 48b are guided between the inner corner part guide rail 111 at the lower end of the vertical guide rail 48b of the transporting cart 13 and the arc-shaped rail part 112 at the lower end of the vertical guide rail 48a and lower around the turning-part toothed wheel 35, when the wheels 18b and 19b are removed from the arc-shaped rail part 112 at the lower end of the vertical guide rail 48a, there is no means for directly guiding the wheels 18b and 19b. At this time, as shown in FIG. 22B, the cam-following roller 25b on the front side of the bottom part of the transporting cart 13 is received on the lower protruding cam 110.

Since the arc surface of the lower protruding cam 110 is formed on an arc surface whose radius is equal to the rotation path of the engaging part 55 around the turning-part toothed wheel 35, the cam-following roller 25b is received by the lower protruding cam 110 and lowers, with the result that the wheels 18b and 19b smoothly lower while keeping a state where the wheels 18b and 19b are fitted to the engaging part 55 of the first endless chain 27. Although the lower protruding cam 110 enters an area below the top plate 14 of the transporting cart 13 as with other lower protruding cams 65 and 66 of the sixth turning pathway section 11 and the third turning pathway section 6 and the lower protruding cam 87 of the second turning pathway section 4, since the lower side of the top plate 14 of the transporting cart 13 is configured as described with reference to FIG. 2, the transporting cart 13 which starts to travel horizontally on the horizontal guide rail 44 in the fourth horizontal pathway section 12 can travel and pass the top of the lower protruding cam 110 without any problem.

As described above, the transporting cart 13 travels the closed circulation traveling pathway consisting of the four horizontal pathway sections 1, 5, 7 and 12 and the two lifting/lowering pathway sections 3 and 9 at a constant speed while keeping the horizontal upright posture whereas in the turning pathway sections 2, 6, 10 and 11 having the lower protruding cams 65, 66, 87 and 110, at the time of the start of the turn or the completion of the turn when the support is unstable, in a state where the three places of the transporting cart 13 which are any one of the front and rear pairs of left and right engaged parts among the four front, rear, left and right engaged parts 16a to 17b in the transporting cart 13 and one auxiliary supported part of the two front and rear auxiliary supported parts 24a and 24b (the cam-following rollers 25a and 25b) located on the opposite side to the engaged parts forward and backward are stably supported, it is possible to smoothly start or complete the turn.

Figure 23:
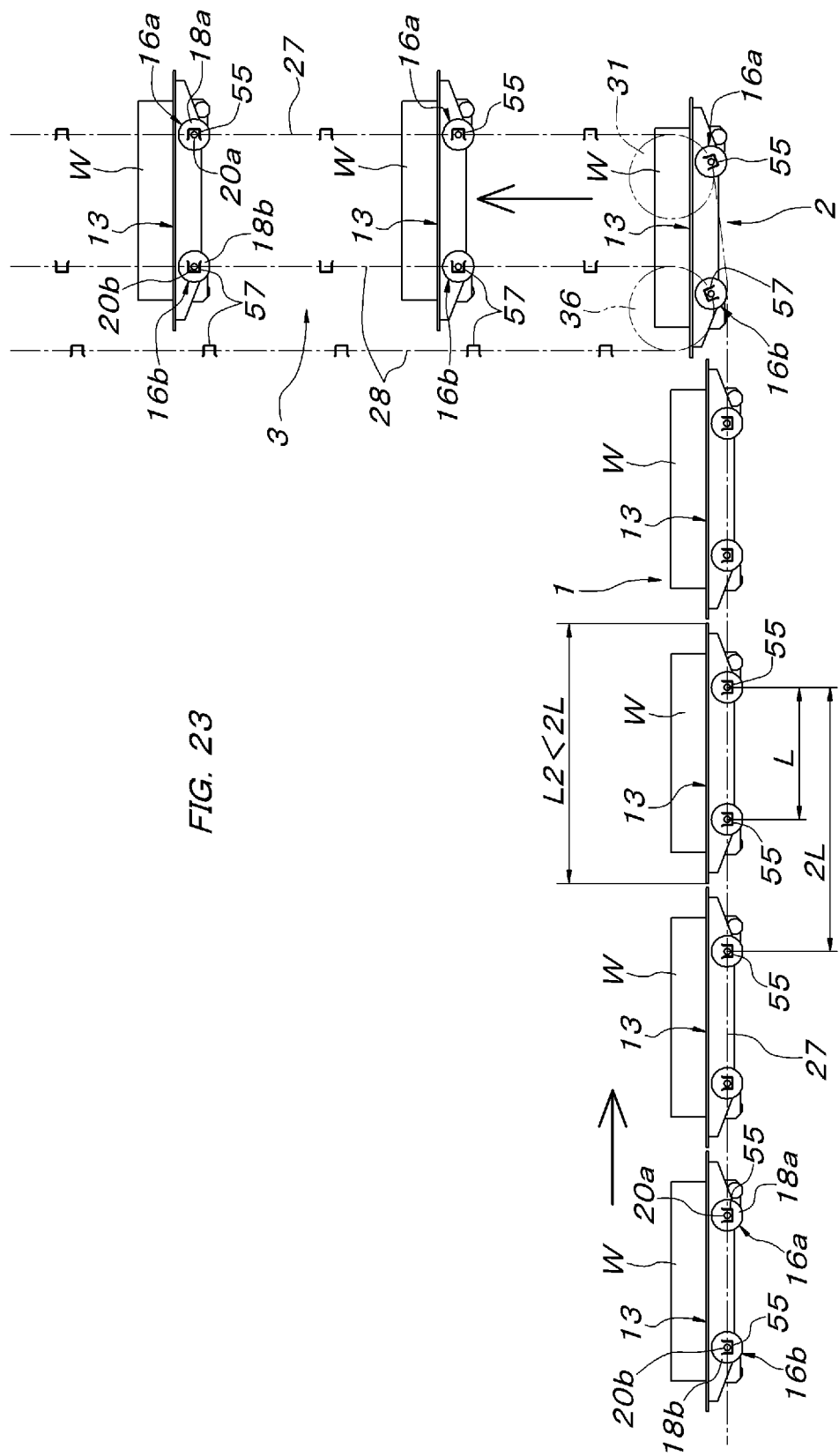
FIG. 23 is a schematic side view showing, in a case where the transporting carts are aligned with a basic pitch, the transporting cart which passes from the first horizontal pathway section through the second turning pathway section to the first lifting/lowering pathway section.

As described previously, the engaging part 55 of the first endless chain 27 and the engaging parts 57 and 58 of the second endless chains 28 and 29 are attached with a pitch equal to the support interval L (the interval between the front and rear of the wheels 18a to 19b) for the transporting cart 13, and it is configured such that the total length L2 of the transporting cart 13 is slightly shorter than twice the support interval L for the transporting cart 13, with the result that in the horizontal pathway sections 1, 5, 7 and 12, the respective transporting carts 13 can be made to travel in a continuous state where both the front and rear ends of the top plate 14 are adjacent to each other. Then, in the lifting/lowering pathway sections 3 and 9, in a state where the wheels 18a and 19a of the transporting carts 13 are separated forward and backward and are individually supported by the engaging parts 55 of the first endless chain 27 and the engaging parts 57 and 58 of the second endless chains 28 and 29, the transporting carts 13 move up and lower parallel to each other while keeping the horizontal upright posture. As described above, when the transporting carts 13 move up and lower in the lifting/lowering pathway sections 3 and 9, as is clear from the reference diagram shown in FIG. 23, the vertical interval between the transporting carts 13 is twice as long as the support interval L for the transporting cart 13.

For example, as shown in FIG. 1, the transporting device described above can be used for the transport of the load W such that the load W is loaded on the transporting cart 13 located in the beginning end part of the low-position first horizontal pathway section 1 and that the load W is unloaded from the transporting cart 13 located in the terminal end part of the high-position second horizontal pathway section 5. It is a matter of course that the transporting device described above can be used such that the first endless chain 27 and the second endless chains 28 and 29 are reversely rotated so as to transport the load W from on the high-position second horizontal pathway section 5 to on the low-position first horizontal pathway section 1. In any case, the loading and unloading of the load W with respect to the transporting cart 13 can be performed with the turning-part toothed wheel 30 of the sixth turning pathway section 11 and the auxiliary rotating body 49 (the turning-part toothed wheel 33 of the third turning pathway section 6 and the auxiliary rotating body 50) either with respect to the transporting cart 13 supported at the same level as the first horizontal pathway section 1 or with respect to the transporting cart 13 supported by the first horizontal pathway section 1 (the second horizontal pathway section 5 further upstream than the third turning pathway section 6) further downstream than the sixth turning pathway section 11.

In the transporting device configured as described above, the allowable height of the load W loaded on the respective transporting cart 13 is determined within the range in which, regardless of the forward rotation and the reverse rotation of the transporting cart 13, one of two front and rear transporting carts 13 adjacent to each other which move between the horizontal pathway section 1 or the horizontal pathway section 5 and the first lifting/lowering pathway section 3 through the first turning pathway section 2 or the second turning pathway section 4 is prevented from colliding against the load W loaded on the other transporting cart 13. For example, in a place shown in FIG. 23, when the load W loaded on the transporting cart 13 is higher than the one shown in the figure, the transporting cart 13 on the front side which is moving up to the first lifting/lowering pathway section 3 in the first turning pathway section 2 collides against the load W loaded on the transporting cart 13 on the rear side which is directly behind the front-side transporting cart 13 and which is about to enter the first turning pathway section 2 from the first horizontal pathway section 1. In the transporting device configured in the embodiment described above, in a case where the load W whose height exceeds the above-described allowable range is handled, as shown in FIG. 24, the pitch in the horizontal traveling direction of the transporting carts 13 in the horizontal pathway sections 1, 5, 7 and 12 is set within a range of twice (=2L) to three times (=3L) the support interval for the transporting cart 13, and thus the load W can be transported without any problem even if the load W is a load W2 whose height is substantially equal to the support interval L for the transporting cart 13.

As described above, in a case where the pitch in the horizontal traveling direction of the transporting carts 13 is changed, in the transporting device of the embodiment, as shown in FIG. 2A, since the projection shafts 20a to 21b of the respective engaged parts 16a to 17b of the transporting cart 13 are detachably fitted to the respective engaging parts 55 of the first endless chain 27 in the vertical direction, the transporting cart 13 can be freely attached/detached with respect to the circulation traveling pathway, for example, in the low-position first horizontal pathway section 1. Hence, in the transporting cart 13, it suffices to set the pitch in the horizontal traveling direction to twice (=2L) or three times (=3L) the support interval L according to the height of the load W to be handled. Since the transporting cart 13 can be freely attached/detached in the horizontal pathway section in the vertical direction, in the loading and unloading of the load W with respect to the circulation traveling pathway, when the entire transporting cart 13 to which the load W is loaded is lightweight, it can be handled manually whereas in a case where the entire transporting cart 13 to which the load W is loaded is a heavy item, it can be loaded and unloaded with an automatic machine such as a forklift.

The circulation traveling pathway of the transporting cart 13 described in the above embodiment is an example, and is not restricted thereto. That is, transporting devices of various types of layouts can be configured by combining part or the whole of the first turning pathway section 2 to the sixth turning pathway section 11 with horizontal pathway sections having arbitrary lengths. For example, it is possible to easily realize a layout in which the fourth turning pathway section 8 in the above embodiment is made reverse in front and rear and in which the upper end of the second lifting/lowering pathway section 9 is directly connected to the second horizontal pathway section 5, a layout in which the second turning pathway section 4 is made reverse in front and rear and in which the lower end of the first lifting/lowering pathway section 3 is directly connected to the fourth horizontal pathway section 12, a layout in which both the layouts described above are combined, in which the third turning pathway section 6, the third horizontal pathway section 7, the sixth turning pathway section 11 and the first horizontal pathway section 1 are omitted and in which the transporting carts 13 are circulated in the shape of a rectangle and the like. Furthermore, it is possible to realize, as necessary, a layout in which the transporting carts 13 travel in a circulating manner in a concave shape or a convex shape and the like.

The cart-type transporting device of the present invention can be utilized as a transporting device in which in a lifting/lowering pathway section provided in the circulation traveling pathway of a transporting cart, a chain conveyor for propelling the transporting cart in a horizontal pathway section is used as it is without use of a dedicated lifter and in which thus it is possible to stably and smoothly lift and lower the transporting cart.

What is claimed is:

1. A cart-type transporting device comprising:
   a pair of left and right first endless chains, each of the left and right first endless chains being continuous from one of a horizontal pathway section and a lifting/lowering pathway section to the other, wherein the horizontal pathway section and the lifting/lowering pathway section connected to each other via a turning pathway section,
   a pair of left and right second endless chains in the lifting/lowering pathway section, the pair of left and right second endless chains being aligned in parallel to the pair of left and right first endless chains and rotating in an interlocking manner with the first endless chains,
   in the first endless chains and the second endless chains, engaging parts are provided which move up and lower, in the lifting/lowering pathway section, at a same height in a same direction parallel to each other,
   the transporting cart having four engaged parts which engage with the engaging parts of the first endless chains and the engaging parts of the second endless chains, the four engaged parts including two front and rear engaged parts provided on both left and right sides of the transporting cart,
   each of the engaged parts of the transporting cart having a wheel pivotally supported by the transporting cart, and having a projection shaft concentrically protruding from the respective wheel,
   each of the engaging parts of the first endless chains being open upward in the horizontal pathway section and including a concave part open horizontally laterally directed to a second endless chain side in the lifting/lowering pathway section,
   each of the engaging parts of the second endless chains including a concave part open horizontally laterally directed to a first endless chain side in the lifting/lowering pathway section,
   the engaging parts of the first endless chain are provided in a symmetric orientation at the same height as each of the engaging parts of the second endless chain, and
   in the horizontal pathway section, the concave parts of the engaging parts of the first endless chains being operable to detachably receive the projection shafts of the four engaged parts of the transporting cart, in a vertical direction, and the transporting cart being supported by the first endless chains so as to be capable of being attached/detached from the first endless chains in a vertical direction by way of the four engaged parts,
   whereby, in the horizontal pathway section, a position of the transporting cart on the first endless chains can be easily changed to adjust an interval between adjacent transporting carts according to a height of a load that is loaded on the transporting cart.

2. The cart-type transporting device according to claim 1, wherein all the engaging parts of the first endless chains are aligned at regular intervals equal to intervals between the engaged parts of the transporting cart in a forward and backward direction.

* * * * *